United States Patent
Shaashua et al.

(10) Patent No.: US 10,990,894 B2
(45) Date of Patent: Apr. 27, 2021

(54) SITUATION FORECAST MECHANISMS FOR INTERNET OF THINGS INTEGRATION PLATFORM

(71) Applicant: Neura, Inc., Sunnyvale, CA (US)

(72) Inventors: Triinu Magi Shaashua, Herzeliya (IL); Ori Shaashua, Herzeliya (IL)

(73) Assignee: NEURA, INC., Sunnyvale, CA (US)

( * ) Notice: Subject to any disclaimer, the term of this patent is extended or adjusted under 35 U.S.C. 154(b) by 0 days.

(21) Appl. No.: 15/181,191

(22) Filed: Jun. 13, 2016

(65) Prior Publication Data
US 2016/0342906 A1 Nov. 24, 2016

Related U.S. Application Data

(63) Continuation-in-part of application No. 13/957,259, filed on Aug. 1, 2013, now Pat. No. 9,372,922, and a
(Continued)

(51) Int. Cl.
*G06N 20/00* (2019.01)
*H04W 4/38* (2018.01)
(Continued)

(52) U.S. Cl.
CPC .......... *G06N 20/00* (2019.01); *G06F 16/35* (2019.01); *G06F 16/9535* (2019.01);
(Continued)

(58) Field of Classification Search
CPC .............. G06N 99/005; G06N 20/00; G06F 17/30705; G06F 16/35; G06F 16/9535;
(Continued)

(56) References Cited

U.S. PATENT DOCUMENTS 5,831,853 A 11/1998 Bobrow et al.
6,601,026 B2 7/2003 Appelt et al.
(Continued)

FOREIGN PATENT DOCUMENTS

CN 101833710 A 9/2010
CN 101916106 A 12/2010
(Continued)

OTHER PUBLICATIONS

First Office Action dated Jul. 25, 2017, for Chinese Patent Application No. 201780050216.7, 33 pages.
(Continued)

*Primary Examiner* — Jensen Hu
(74) *Attorney, Agent, or Firm* — Perkins Coie LLP

(57) ABSTRACT

A method of consolidating Internet of Things (IoT) devices connected via an IoT network is disclosed. An IoT integration platform implemented by a computer system can collect data from one or more of IoT devices, IoT solution specific server systems, third-party server systems, general-purpose user computing devices, or any combination thereof. The IoT integration platform can label the data based on entity-specific context. The entity-specific context can correspond to a user account, a device, a location, or any combination thereof. The IoT integration platform can generate an entity-specific profile based on the labeled data. The IoT integration platform can generate, based on the entity-specific profile, a situation forecast associated with a target entity and with a timeframe yet to occur.

26 Claims, 23 Drawing Sheets

Related U.S. Application Data continuation-in-part of application No. 13/957,255, filed on Aug. 1, 2013, now Pat. No. 9,600,571.

(60) Provisional application No. 61/845,369, filed on Jul. 11, 2013.

(51) Int. Cl.
| | | |
|---|---|---|
| *H04W 4/029* | (2018.01) | |
| *H04L 29/08* | (2006.01) | |
| *G06F 16/9535* | (2019.01) | |
| *G06F 16/35* | (2019.01) | |
| *H04W 4/70* | (2018.01) | |

(52) U.S. Cl.
CPC .............. *H04L 67/12* (2013.01); *H04L 67/22* (2013.01); *H04L 67/303* (2013.01); *H04L 67/306* (2013.01); *H04W 4/029* (2018.02); *H04W 4/38* (2018.02); *H04L 67/18* (2013.01); *H04W 4/70* (2018.02)

(58) Field of Classification Search
CPC ......... H04W 4/38; H04W 4/029; H04W 4/70; H04L 67/12; H04L 67/22; H04L 67/303; H04L 67/306; H04L 67/18
USPC ........................................................ 707/737
See application file for complete search history.

(56) References Cited

U.S. PATENT DOCUMENTS

| | | | |
|---|---|---|---|
| 7,216,179 | B2 | 5/2007 | Ott et al. |
| 7,353,246 | B1 | 4/2008 | Rosen et al. |
| 7,363,223 | B2 | 4/2008 | Chaudhari et al. |
| 7,609,651 | B1 | 10/2009 | McBride et al. |
| 7,630,976 | B2 | 12/2009 | Zhang et al. |
| 7,921,686 | B2 | 4/2011 | Bagepalli et al. |
| 7,937,480 | B2 | 5/2011 | Alperovitch et al. |
| 7,974,869 | B1 | 7/2011 | Sharma et al. |
| 8,271,878 | B2 | 9/2012 | Kane et al. |
| 8,280,009 | B2 | 10/2012 | Stepanian |
| 8,489,596 | B1 | 7/2013 | Milton et al. |
| 8,881,257 | B2 | 11/2014 | Cha et al. |
| 8,965,845 | B2 | 2/2015 | Calo et al. |
| 9,094,407 | B1 | 7/2015 | Matthieu et al. |
| 9,237,062 | B2 | 1/2016 | Ermis et al. |
| 9,325,468 | B2 | 4/2016 | Mitola, III |
| 9,372,922 | B2 | 6/2016 | Shaashua et al. |
| 9,509,788 | B2 | 11/2016 | Pal et al. |
| 9,594,907 | B2 | 3/2017 | Duke et al. |
| 9,600,571 | B2 | 3/2017 | Shaashua et al. |
| 10,075,339 | B2 | 9/2018 | Bandyopadhyay et al. |
| 2003/0217125 | A1 | 11/2003 | Brancati et al. |
| 2004/0267385 | A1* | 12/2004 | Lingemann ............ G05B 15/02 700/83 |
| 2005/0193222 | A1 | 9/2005 | Greene et al. |
| 2007/0112574 | A1 | 5/2007 | Greene |
| 2007/0118639 | A1 | 5/2007 | Bellifemine et al. |
| 2008/0097822 | A1 | 4/2008 | Schigel et al. |
| 2008/0275864 | A1 | 11/2008 | Kim et al. |
| 2009/0006469 | A1 | 1/2009 | Jain et al. |
| 2009/0063665 | A1 | 3/2009 | Bagepalli et al. |
| 2009/0089078 | A1 | 4/2009 | Bursey |
| 2009/0171906 | A1 | 7/2009 | Adams et al. |
| 2009/0265106 | A1* | 10/2009 | Bearman ................ G06Q 10/00 701/300 |
| 2011/0218037 | A1 | 9/2011 | Singh et al. |
| 2012/0079092 | A1 | 3/2012 | Woxblom et al. |
| 2012/0123993 | A1* | 5/2012 | Wang ................ G06F 17/30693 706/52 |
| 2012/0150642 | A1 | 6/2012 | Kandanala et al. |
| 2012/0244885 | A1 | 9/2012 | Hefetz et al. |
| 2012/0265811 | A1 | 10/2012 | Bist |
| 2012/0284777 | A1 | 11/2012 | Eugenio et al. |
| 2012/0296909 | A1 | 11/2012 | Cao et al. |
| 2012/0303618 | A1 | 11/2012 | Dutta et al. |
| 2012/0311139 | A1 | 12/2012 | Brave et al. |
| 2013/0159220 | A1* | 6/2013 | Winn ................ G06F 17/30702 706/12 |
| 2013/0173621 | A1 | 7/2013 | Kapoor et al. |
| 2013/0258953 | A1 | 10/2013 | Huang et al. |
| 2013/0304869 | A1 | 11/2013 | Gupta et al. |
| 2014/0047322 | A1 | 2/2014 | Kim et al. |
| 2014/0181947 | A1 | 6/2014 | Lund et al. |
| 2014/0236943 | A1 | 8/2014 | Li et al. |
| 2014/0241354 | A1 | 8/2014 | Shuman et al. |
| 2014/0244834 | A1* | 8/2014 | Guedalia ................ H04L 67/16 709/224 |
| 2014/0280108 | A1* | 9/2014 | Dunn ................ G06F 17/30699 707/728 |
| 2014/0310243 | A1 | 10/2014 | McGee et al. |
| 2014/0328258 | A1 | 11/2014 | Cheng et al. |
| 2014/0330959 | A1 | 11/2014 | Zhang |
| 2014/0344474 | A1 | 11/2014 | Sevilla et al. |
| 2014/0351180 | A1* | 11/2014 | Canoy .................... G06N 20/00 706/12 |
| 2014/0377727 | A1* | 12/2014 | Yom-Tov ................ G16H 50/50 434/236 |
| 2014/0380264 | A1 | 12/2014 | Misra et al. |
| 2015/0006695 | A1 | 1/2015 | Gupta |
| 2015/0019342 | A1 | 1/2015 | Gupta |
| 2015/0019553 | A1 | 1/2015 | Shaashua et al. |
| 2015/0019710 | A1 | 1/2015 | Shaashua et al. |
| 2015/0019714 | A1 | 1/2015 | Shaashua et al. |
| 2015/0039635 | A1 | 2/2015 | Monjas |
| 2015/0185713 | A1 | 7/2015 | Glickfield et al. |
| 2016/0085698 | A1* | 3/2016 | Mikkola .............. G06F 11/2289 710/8 |
| 2016/0087933 | A1 | 3/2016 | Johnson et al. |
| 2016/0094500 | A1* | 3/2016 | Baca ...................... H04L 51/08 709/206 |
| 2016/0173359 | A1* | 6/2016 | Brenner .............. A61B 5/02438 600/301 |
| 2017/0093982 | A1 | 3/2017 | Shaashua et al. |

FOREIGN PATENT DOCUMENTS

| | | |
|---|---|---|
| CN | 201732463 U | 2/2011 |
| CN | 102215150 A | 10/2011 |
| CN | 102271379 A | 12/2011 |
| CN | 102440009 A | 5/2012 |
| CN | 102687486 A | 9/2012 |
| CN | 102694804 A | 9/2012 |
| CN | 202856780 U | 4/2013 |
| CN | 202870941 U | 4/2013 |
| CN | 103106553 A | 5/2013 |
| WO | 2013046021 A2 | 4/2012 |
| WO | 2013045964 A1 | 4/2013 |
| WO | 2013051009 A2 | 4/2013 |
| WO | 2013072925 A2 | 5/2013 |
| WO | 2013046021 A3 | 7/2013 |
| WO | 2013072926 A3 | 2/2014 |
| WO | 2015179632 A1 | 11/2015 |

OTHER PUBLICATIONS

Final Office Action dated Nov. 5, 2015, for U.S. Appl. No. 13/957,255 of Shaashua et al. filed Aug. 1, 2013.

International Search Report and Written Opinion dated Dec. 11, 2014, for International Application No. PCT/US2014/044857, International Filing Date Jun. 30, 2014, 6 pp.

International Search Report and Written Opinion dated Dec. 25, 2014, for International Application No. PCT/US2014/043923, International Filing Date Jun. 24, 2014, 5 pp.

International Search Report dated Jan. 29, 2015, for International Application No. PCT/2014/043915, International Filing Date Jun. 24, 2014, 2 pp.

Non-Final Office Action dated Jul. 28, 2016 of U.S. Appl. No. 14/315,031 by Shaashua, et al., filed Jun. 25, 2014.

Non-Final Office Action dated Jul. 30, 2015 of U.S. Appl. No. 13/957,259 by Shaashua, T.M., et al., filed Aug. 1, 2013.

(56) References Cited

OTHER PUBLICATIONS

Non-Final Office Action dated Mar. 2, 2015, for U.S. Appl. No. 13/957,255 of Shaashua et al. filed Aug. 1, 2013.
Notice of Allowance dated Feb. 26, 2016 of U.S. Appl. No. 13/957,259 by Shaashua, T.M., et al., filed Aug. 1, 2013.
Notice of Allowance dated Jan. 13, 2016, for U.S. Appl. No. 13/957,259 of Shaashua et al. filed Aug. 1, 2013.
Andreev, Sergey et al., "Internet of Things, Smart Spaces, and Next Generation Networking", 20121-478. (Part 1 pp. 1-239).
Andreev, Sergey et al., "Internet of Things, Smart Spaces, and Next Generation Networking", 2012pp. 1-478. (Part 2 pp. 240-478).
Barnaghi, "SENSAI: An Architecture for the Real World Internet", First International Workshop on Sematic Interoperability for Smart Spaces (SSIS 2010), www//ieee-iscc.org/2010/web_pages/siss/presentation/keynote.pdf, Jun. 30, 2009, 1-77.
Bauer, et al., "IoT Architecture Reference Model (IoT ARM)", Chapter 7 IoT Reference Model, 2013, 1-50.
Breslin, et al., "The Future of Social Networks on the Internet", 2007.
Carrez, Francois, "Internet of Things—Architecture", IoT-A, Deliverable D1.5—Final architectural reference model for the IoT v3.0, 2013pp. 1-499. (Part 1 pp. 1-250).
Carrez, Francois, "Internet of Things—Architecture", IoT-A, Deliverable D1.5—Final architectural reference model for the IoT v3.0, 2013,pp. 1-499. (Part 2 pp. 251-499).
Celesti, et al., "How the Dataweb Can Support Cloud Federation: Service Representation and Secure Data Exchange", 2012 Second Symposium on Network Cloud Computing and Applications, 2012, 73-79.
Gena, et al., "The Evauation of a Social Adaptive Website for Cultural Events"2011, 1-49.
Gronbaek, Inge, "Architecture for the Internet of Things (IoT): API and interconnect", 2008.
Gubbi, et al., "Internet of Things (IoT): A vision, architectural elements, and future directions", Jan. 2013.
Harbor Research, "How the Internet of Things, Social Networks & Creative Collaboration Will Shape Future Market Structure", 2009.
Heflin, et al., "Semantic Interoperability on the Web", 2000.
Hornsby, "From Instant Messaging to Cloud Computing, an XMPP review", 2010.
Lloret, et al., "Ubiquitous Monitoring of Electrical Household Appliances", 2012.
Merriam-Webster, "Recommendation"2015, 1.
Miorandi, et al., "Internet of Things: Vision, applications and research challenges"2012, 1-20.
Molina, "Semantic middleware development for the Internet of Things", Universidad Politecnica de Madrid, 2012, 1-207.
Musial, et al., "Social Networks on the Internet", Jan. 2012.
Pal, et al., "Intelligent Social Network of Devices", Computational Social Networks: Tools Perspectives and Applications, 2012pp. 329-348.
Serbanati, et al., "Building Blocks of the Internet of Things: State of the Art and Beyond", 2011.
Shah, et al., "The Internet of Things: Technologies, Communications and Computing"2014, 1-52.
Tapiador, et al., "Social Stream, a social network framework", 2012.
Van Kranenburg, et al., "The Internet of Things", Oct. 2011.
Weber, "Internet of things—Need for a new legal environment?", 2009.
Zhou, "The Internet of Things in the Cloud: A Middleware Perspective", Table of Contents, 2012, 1-4.
U.S. Appl. No. 15/413,158 of Shaashua et al. filed Jan. 23, 2017.
Notice of Allowance dated Oct. 21, 2016, for U.S. Appl. No. 13/957,255 by Shaashua, T.M., et al., filed Aug. 1, 2013.
Notice of Allowance dated Jan. 13, 2017, for U.S. Appl. No. 14/315,013 of Shaashua et al. filed Jun. 25, 2014.
Notice of Allowance dated May 15, 2017, in U.S. Appl. No. 14/315,031 by Shaashua, T.M. et al., filed Jun. 25, 2014.
Extended European Search Report dated Feb. 3, 2017, for European Patent Application No. 14822501.4 (based on PCT/US201/4043915), pp. 1-8.
Extended European Search Report dated Feb. 28, 2017, for European Patent Application No. EP14823675.5 (based on PCT/US2014/044857), pp. 1-8.
Extended European Search Report dated Mar. 13, 2017, for European Patent Application No. 14823306.7 (based on PCT/US2014043923), pp. 1-5.
First Office Action dated Jun. 2, 2017, for Chinese Patent Application No. 201480050203.X, 14 pages.
Barnaghi, et al., "From Data to Actionable Knowledge: Big Data Challenges in the Web of Things", IEEE Computer Society, 2013, pp. 6-11.
Darianian, et al., "Smart Home Mobile RFID-based Internet-Of-Things Systems and Services", 2008 International Converence on Advanced Computer Theory and Engineering, 2008, pp. 116-120.
ETSI, TR. 101 584 V0.5.0 (Draft), "Machine to Machine Communications (M2M); Study on Semantic support for M2M Data"Dec. 2012, 37 pages.
Huang, Yinghui et al., "A Semantic Analysis for Internet of Things", Int'l Conference on Intelligent Computation Technology and Automation, 2010, pp. 336-339.
Sheth, Amit, "Computing for Human Experience—Semantics-Empowered Sensors, Services, and Social Computing on the Ubiquitous Web", IEEE Internet Computing, pp. 88-91.
Final Office Action dated Apr. 12, 2018 for U.S. Appl. No. 15/366,274 of Shaashua, T. et al. filed Dec. 1, 2016.
International Search Report and Written Opinion dated Sep. 7, 2017 for International Application No. PCT/US2017/037081, 8 pages.
Non-Final Office Action dated Sep. 22, 2017 for U.S. Appl. No. 15/366,274 of Shaashu, T. et al., filed Dec. 1. 2016.
Second Office Action dated Mar. 8, 2018, for Chinese Patent Application No. 201480050200.6 filed Mar. 11, 2016, 3 pages.
Carrez, Francois, "Internet of Things—Architecture", IoT-A, Deliverable D1.5—Final architectural reference model for the IoT v3.0, 2013.
Final Office Action dated Apr. 12, 2018 for U.S. Appl. No. 15/366,274 of Shaashua, T.M., filed Dec. 1, 2016.
Non-Final Office Action dated Jul. 27, 2018 for U.S. Appl. No. 15/413,158 of Shaashua, T.M., et al., filed Jan. 23, 2017.
Second Office Action dated May 28, 2018, for Chinese Patent Application No. 201780050216.7 filed on Mar. 11, 2016, 11 pages.
"Microsoft Computer Dictionary", Fifth edition, Microsoft Press, Microsoft Corporation, 2002, 3 pages.
Kim, Allen, "Internet-centric Solution is More Than Moving Online", Lexology, 2015, 2 pages.
Manavoglu, Eren et al., "Probabilistic User Behavior Models", Proceedings of the Third IEEE International Conference on Data Mining (ICDM'03), 2003, 8 pages.
European Supplemental Search Report dated Dec. 20, 2019, for European Application No. 27824885.8, 8 pages.

* cited by examiner

SITUATION FORECAST MECHANISMS FOR INTERNET OF THINGS INTEGRATION PLATFORM

CROSS-REFERENCE TO RELATED APPLICATION

This application is a continuation-in-part application of U.S. patent application Ser. No. 13/957,259, filed on Aug. 1, 2013 and U.S. patent application Ser. No. 13/957,255, filed on Aug. 1, 2013, both of which claim the benefits of U.S. Provisional Patent Application Ser. No. 61/845,369 filed Jul. 11, 2013, and the subject matter thereof is incorporated herein by reference in their entirety.

FIELD OF INVENTION

This invention relates generally to the technical areas of the Internet of Things.

INTRODUCTION

The Internet of Things (IoT) refers to devices and their virtual representations in an Internet-like structure. The concept of IoT devices includes networked devices ("connected devices") capable of communicating with a server or with a mobile application via a network connection. The networked devices may include passive and active devices, where the passive devices may achieve network connectivity through interactions with the active devices. IoT devices are intended to achieve ubiquitous connection for intelligent perception, identification and management of items and processes. Many consider IoT as the third wave of development of information industry following the computer and the Internet. However, solutions for management of IoT devices are generally vertical solutions.

DISCLOSURE OF TECHNOLOGY

Disclosed is a technology for creating an integration platform for the Internet of Things ("the technology"). The technology further enhances the integration platform to connect to not only devices, but also other physical entities, such as places and people ("Internet of Everything"). The technology is a consumer solution to consolidate and automate users' connected environment. The technology can identify and profile connected devices around a consumer, communicate with the connected devices, and create logical connections amongst people, devices, locations, digital channels, or any combination thereof.

The technology may be implemented by the integration platform. The integration platform may include a consolidation interface, a data correlation module, a data analysis module, and a rule development module. The consolidation interface is a centralized interface accessible via one or more of the networked devices. The consolidation interface may include an interactive visual component including an interactive user interface and visual recognition of places, situations, and people, an interactive audio component including voice control, an interactive gesture component, or any combination thereof. The consolidation interface provides a single interface to view/edit consolidated data and to interact with the networked devices. The data correlation module associates data and metadata from the networked devices to relate these data and/or metadata to a user. The data analysis module analyzes the collected data and metadata to determine specific semantic label or context relevant to the user.

The rule management module enables configuration, adjustments, and interactions with the networked devices based on user-profile, context, event trigger, user behavior, social interactions, user configurations, or any combination thereof. The rule management module may embody these configurations, adjustments, and interactions in one or more interoperable rules. These interoperable rules may be executed on the connected devices. The interoperable rules may be implemented in reference to any node, such as any person, place, device, group, or other entity, thing or object. Because of context recognition as enabled by the data analysis module, the one or more interoperable rules for each node may be designed and manipulated in context.

Some embodiments of the invention have other aspects, elements, features, and steps in addition to or in place of what is described above. These potential additions and replacements are described throughout the rest of the specification.

The figures depict various embodiments of the technology for purposes of illustration only. One skilled in the art will readily recognize from the following discussion that alternative embodiments of the structures and methods illustrated herein may be employed without departing from the principles of the technology described herein.

DETAILED DESCRIPTION

Integration

Figure 1A:
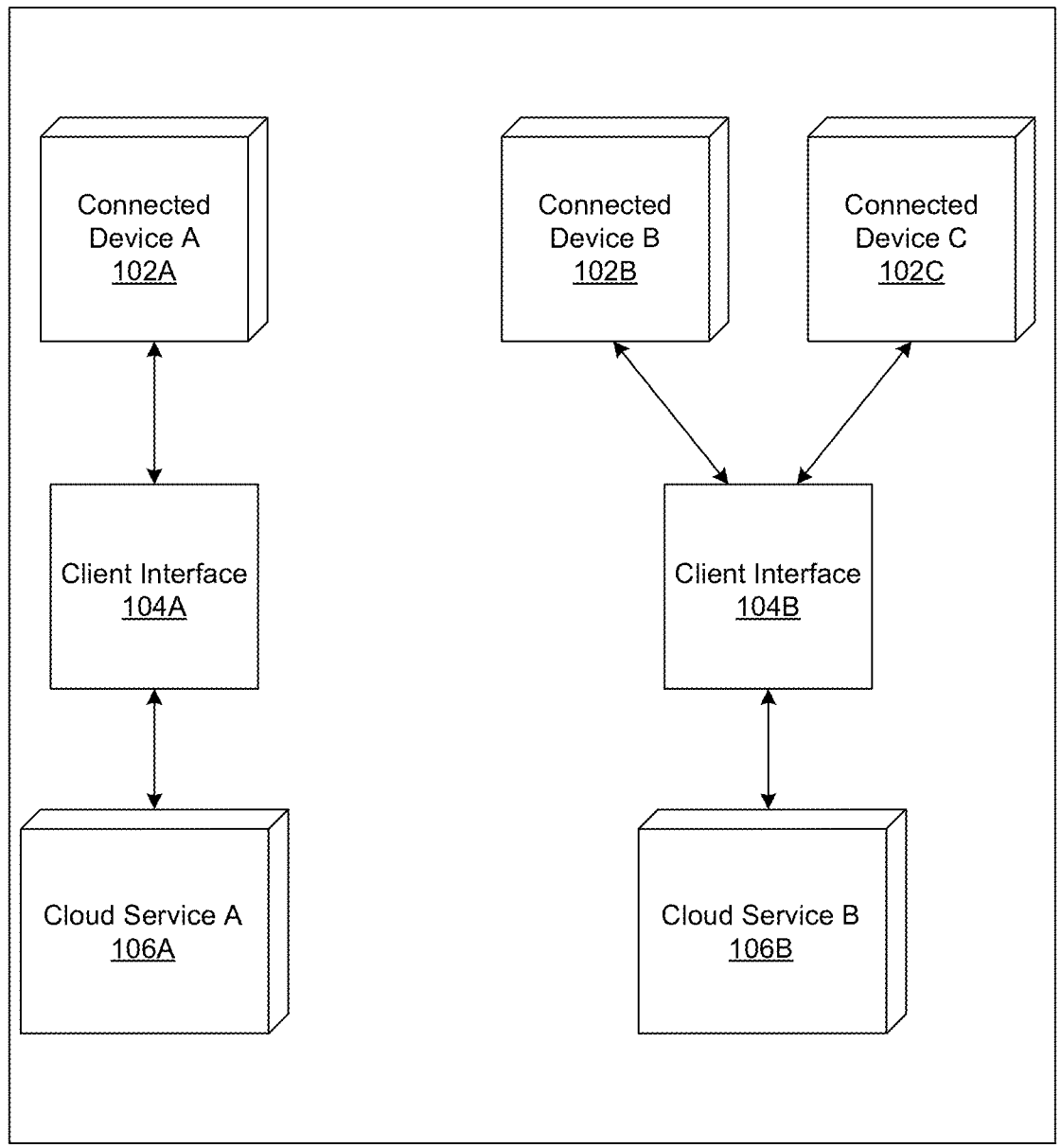
FIG. 1A is a block diagram illustrating vertical solutions provided for connected devices.

Every day more and more newly connected devices are introduced into the market each offering a vertical solution with a specific functionality. All these various solutions do not communicate to each other. For example, FIG. 1A is a block diagram illustrating vertical solutions provided for connected devices, such as device-A 102A, device-B 102B, and device C 102C (collectively "devices 102"). Each connected devices service provider may have its own vertical solution with a client interface (e.g., mobile or web), such as interface-A 104A and interface-B 104B (collectively "interfaces 104"), and one or more cloud services for computation, such as cloud service-A 106A or cloud service-B 106B (collectively "cloud services 106").

Figure 1B:
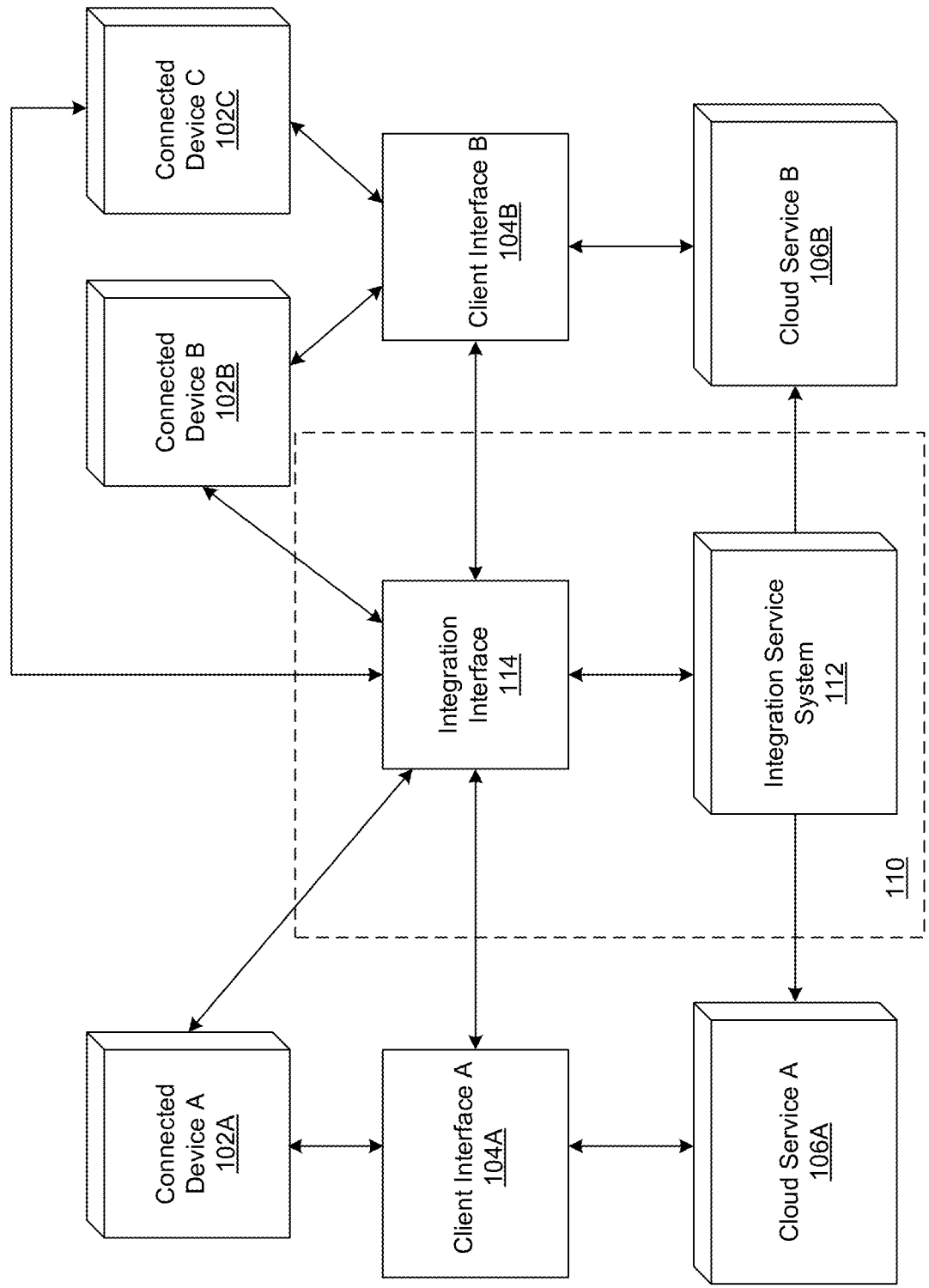
FIG. 1B is a block diagram illustrating an integration platform operating in conjunction with the vertical solutions.

Different devices 102 use different communications protocols made by different manufacturers. The integration platform may act as single point of interaction enabling cross-device and cross technology communication. FIG. 1B is a block diagram illustrating an integration platform operating in conjunction with the vertical solutions. The integration platform may be implemented through communication integration, including a unified application programming interface (API), unified software development kit (SDK), unified protocol(s), and/or interoperability interfaces between different connected devices. The integration platform mainly can be implemented by an integration service system 112 (e.g., the computer system 500 of FIG. 5) and an integration interface 114 (e.g., mobile or web). The integration service system 112 may provide different services for integration of the IoT devices 102 and for providing an execution environment for applications related to the use of the IoT devices 102. The integration interface 114 may be a software application that runs on a local computing device that is capable of managing or integrating the IoT devices 102 within a local network.

System Environment

Figure 2:
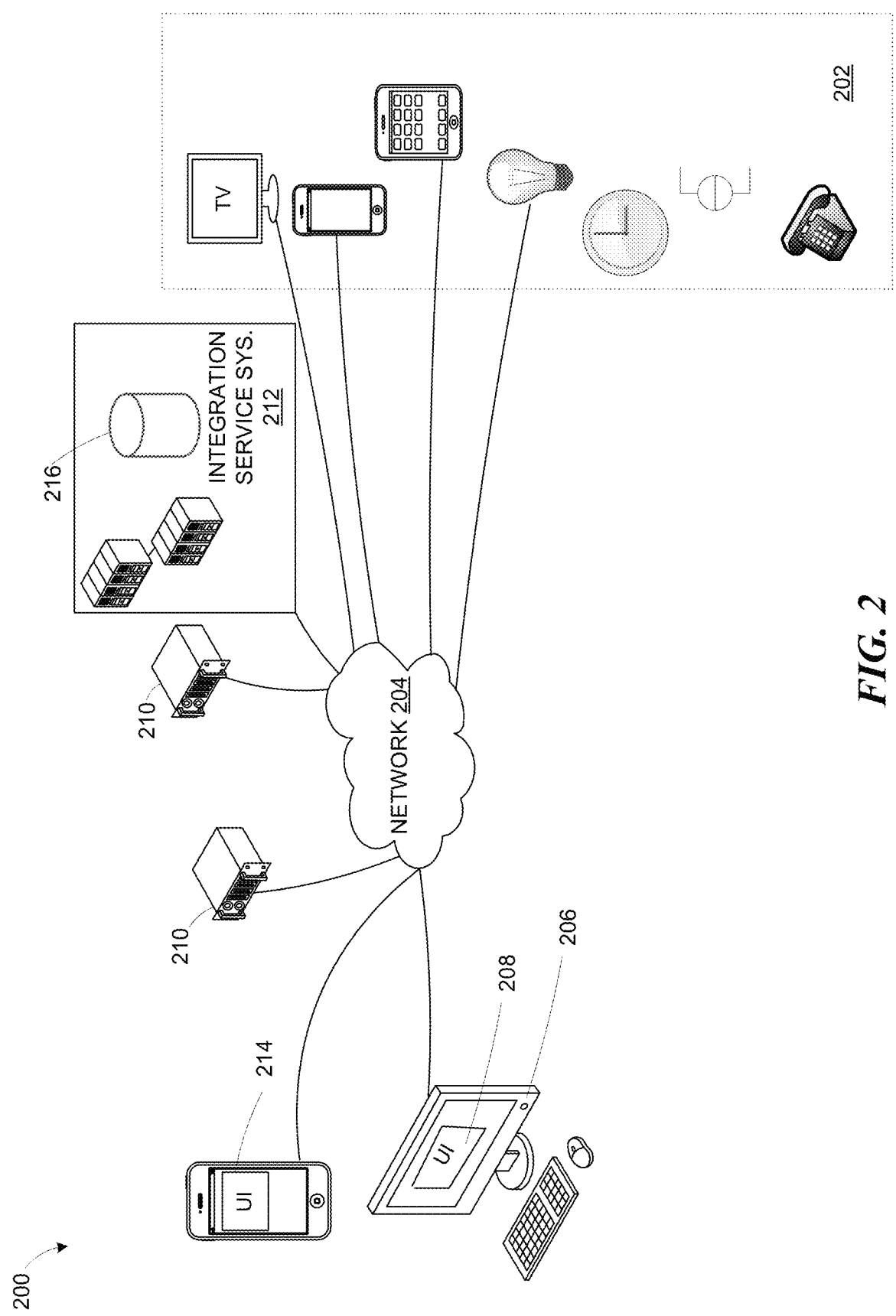
FIG. 2 is a block diagram illustrating an example system environment of an internet of things (IoT) integration platform system.

FIG. 2 is a block diagram illustrating an example system environment of an internet of things (IoT) integration platform system 200. The IoT integration platform system 200 includes IoT devices 202, such as the IoT devices 102 of FIG. 1. IoT devices 202, for example, can be smart phones, smart watches, smart sensors (e.g., mechanical, thermal, electrical, magnetic, etc.), networked appliances, networked peripheral devices, networked lighting system, communication devices, networked vehicle accessories, smart accessories, tablets, smart TV, computers, smart security system, smart home system, other devices for monitoring or interacting with or for people and/or places, or any combination thereof. The IoT devices 202 may include the wireless device 600 of FIG. 6. The IoT devices 202 may include one or more of the following components: sensor, radio frequency identification (RFID) technology, global positioning system technology, mechanisms for real-time acquisition of data, passive or interactive interface, mechanisms of outputting and/or inputting sound, light, heat, electricity, mechanical force, chemical presence, biological presence, location, time, identity, other information, or any combination thereof.

The IoT devices 202 are connected via a network 204. The network 204 may include different channels of communication and may include local networks therein. For example, the network 204 may include wireless communication through cellular networks, WiFi, Bluetooth, Zigbee, or any combination thereof. The network 204 may include one or more switches and/or routers, including wireless routers that connect the wireless communication channels with other wired networks (e.g., the Internet). A local network may exist that connects a local set of the IoT devices 202. For example, the local network may be established by a local router or a local switch.

For example, the IoT devices 202 may be connected to a control device 206 within the local network. The control device 206 may be a computer, a networked device, or a mobile device, such as the wireless device 600. The control device 206 may include an interface implemented by a solution-specific application 208. An IoT device may be coupled to the solution-specific application 208, where the solution-specific application 208 is created specifically to communicate with such devices as part of a vertical solution. The solution-specific application 208 may be able to control the IoT device or to access data from the IoT device.

IoT devices may also communicate with a solution-specific server system 210. For example, a networked lighting system may communicate with the solution-specific server system 210 keeping track of whether lights are on/off on the solution-specific server system 210. The solution-specific server system 210 can create an interface to share that data and/or to interact with the IoT devices. The interface may be accessible through the solution-specific application 208 or through a browser.

The technology disclosed includes an integration service system 212, such as the integration service system 112, and an integration interface 214, such as the integration interface 114, that can manage or integrate multiple instances of the IoT devices 202 and co-exist with the vertical solutions. The integration interface 214 may run on the control device 206. The integration interface 214 may be a computing application, a web page, and/or other interactive interface operable on a computing device. The disclosed integration service system 212 and/or the integration interface 214 overcome the challenge of user inconvenience. Vendors who manufacture IoT devices 202 do not have a consistent standard to provide a unified interface. The proposed system provides a technology including specific modules and processes to coordinate with the multiple IoT devices 202, the multiple solution-specific applications 208, and the multiple instances of the solution-specific server system 210.

The integration service system 212 may include a profile store 216 of IoT devices 202 and other context relevant entities. For example, context relevant entities may include people, places, groups, physical objects, brands, things, or any combination thereof. Some of the context relevant entities in the integration service system 212 may not include any networking capabilities, but may be observed through the connected IoT devices 202 either directly or indirectly. The integration service system 212 may profile these entities, such as via a data analysis module 308 described below in FIG. 3, and store these entity profiles in the profile store 216 for reference. Interaction with these profiled entities may be enabled by visual identification (e.g., image recognition), voice recognition, motion detection, geo-location, other input data to the IoT devices 202, or any combination thereof.

As an example, an IoT device 202 with a camera can recognize a known user is in front of a plate and fork (e.g., within a context of "eating"). Such recognition may trigger an increase of the known user's target daily steps in his/her activity monitor (e.g., due to higher calorie intake), or trigger the known user's coffee machine to prepare an espresso. In this example the plate and fork do not have network capability, but do have profiles in the profile store 216. The recognition of the profiles may be a trigger for an action in the connected devices.

As another example, detecting proximity to a person (e.g., a child) or a place (e.g., a child's room) may trigger wearable IoT devices 202 (e.g., sensors) on the child to synchronize relevant data to the integration service system 212, such as the child's glucose level. The integration service system 212 may respond to this trigger by analyzing the relevant data, and visualizing a relevant correlative insight (e.g., "inject more insulin") based on the analyzed data on a parent's smartphone or wearable device. The integration service system 212 may further execute an interoperable rule upon detection of the trigger, such as by sending a command to another IoT device (e.g., an insulin pump). In this example, the trigger may be based on a contextual or semantic profiling of a person or place, and not necessarily another device.

System Architecture

Figure 3:
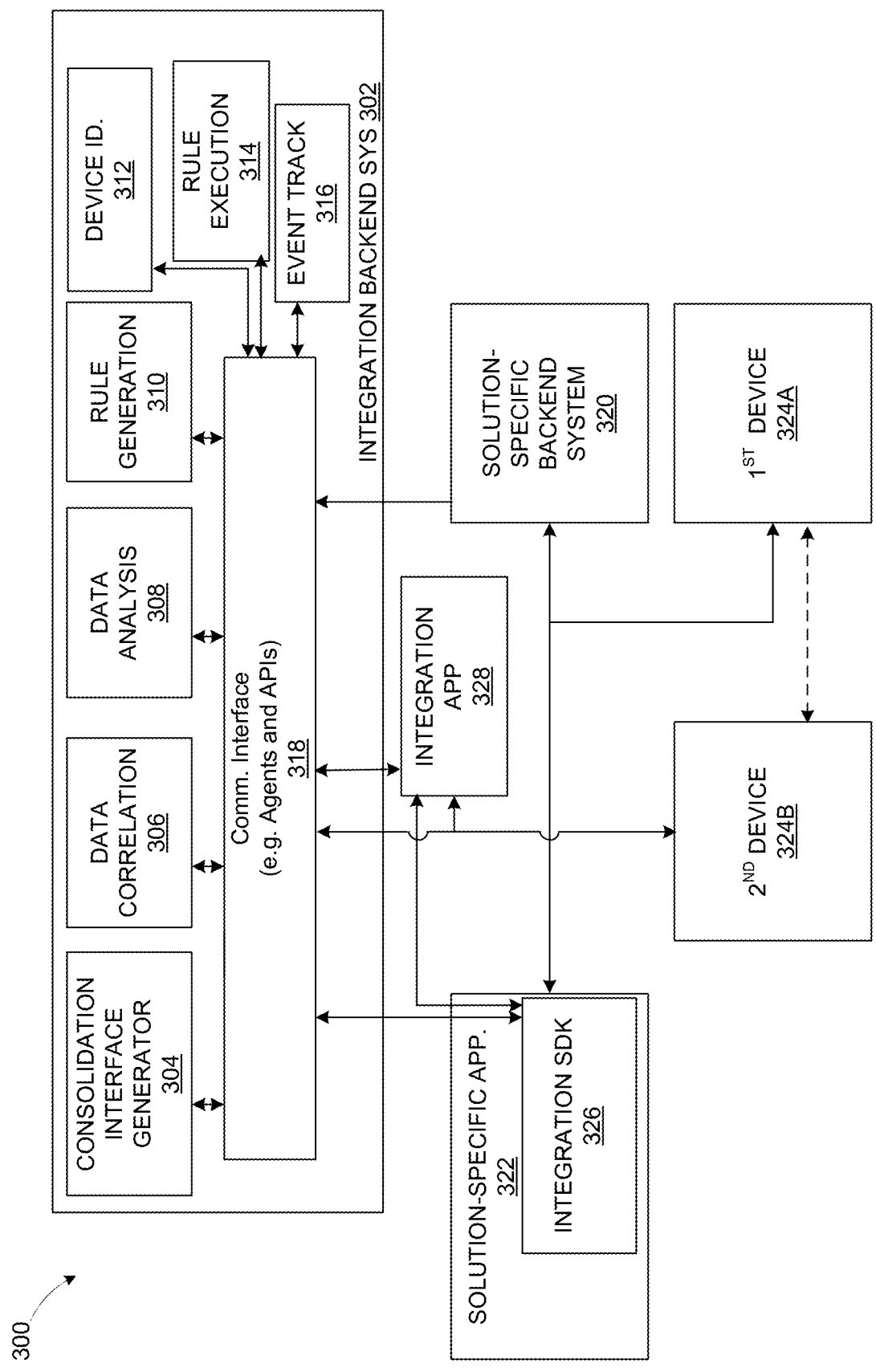
FIG. 3 is a block diagram illustrating the IoT integration platform system.

FIG. 3 is a block diagram illustrating the IoT integration platform system 300. The modules therein may be implemented by a computer system, such as the computer system 500 of FIG. 5. The IoT integration platform system 300 may include an integration backend system 302, such as the integration service system 212 of FIG. 2. The integration backend system 302 may include a consolidation interface generator 304, a data correlation module 306, a data analysis module 308, a rule generation module 310, a device identification module 312, a rule execution module 314, and an event track module 316. The integration backend system 302 may also include a communication interface module 318 for interfacing with the IoT devices and/or client interfaces.

The IoT integration platform system 300 may enable integration of vertical solutions of IoT devices, such as the vertical solutions illustrated in FIG. 1A and FIG. 1B. For example, a vertical solution may include a solution-specific backend system 320, a solution-specific application 322, and/or a first IoT device 324A. For example, the first IoT device 324A may communicate with the solution-specific backend system 320 and/or the solution-specific application 322 as part of the vertical solution. The IoT integration platform system 300 enables a second IoT device 324B to become connected, even though the second IoT device 324B is not part of the vertical solution. Collectively, the connected devices including the first and second IoT devices 324A and 324B may be referred to as "the IoT devices 324." The technology to implement such integration may be achieved via the integration backend system 302, an integration application 328, such as the integration interface 214 of FIG. 2, or both. In various embodiments, any one or more of the modules of the integration backend system 302 may be implemented within the integration application 328.

For example, integration may be achieved in any combination of the following methods, including cloud-based integration, mobile-based integration, and device-based integration. The integration method may depend on the manufacture of each of the IoT devices 324. Regardless of the integration method, the integration backend system 302 and/or the integration application 328 are informed of the existence of any newly connected IoT device.

For cloud-based integration, the communication interface module 318 enables communication between or amongst the integration backend system 302 and one or more of the solution specific backend systems 320. For mobile-based integration, the integration application 328 may communicate with the solution-specific application 322. For example, this communication may be achieved by providing an integration SDK 326 to the solution-specific application 322 and/or the integration application 328. For device-based integration, the integration application 328 may communicate with the IoT devices 324 belonging to different vertical solutions via an open protocol. For example, the integration application 328 may scan different local networks (e.g., Wi-Fi, Bluetooth, Bluetooth Low Energy, Zigbee, etc.), identify the IoT devices 324, and connect to control interfaces of each of the IoT devices 324.

For example, the communication interface module 318 may include an agent for communicating with an API on the solution-specific backend system 320. Alternatively, the communication interface module 318 may include an API of its own, and may allow the solution-specific backend system 320 to send/retrieve data, including real-time data, context data, sensor data, sensor metadata, configuration data, or any combination thereof, through the API.

As another example, the integration SDK 326 can embed communication processes/protocols for communicating with the communication interface module 318 of the integration backend system 302 and/or the integration application 328. In some embodiments, the integration application 328 may be distributed from the integration backend system 302. For example, the IoT devices 324 that have Wi-Fi connectivity may become visible to the integration platform 300 when in the Wi-Fi networks where the integration application 328 is connected.

As yet another specific example, an IoT device 324, such as the second IoT device 324B may integrate directly with the integration backend system 302 and/or the integration application 328. The second IoT device 324B may be configured such that the protocols and processes for communicating with the integration backend system 302 and/or the integration application 328 are stored thereon. Optionally, a device integration SDK (not shown), similar to the integration SDK 326, may be configured within an IoT device 324. The integration device SDK may enable the IoT devices 324 to communicate with the integration backend system 302, the integration application 328, and/or with each other (shown as a dotted line connection).

Device Identification

The device identification module 312 is configured to generate a unique ID for each IoT device detected by the integration platform 300. The unique ID enables tracking of the IoT devices for the purposes of authentication, data access permissions and security, data correlation, data analysis, rule generation, rule execution, event tracking, and/or user interface. In some embodiments, the device identification module 312 may also detect the type and/or make of the IoT devices. The type may define the data structure of the IoT device, actions that are applicable to IoT device, and/or communication protocols and processes of the IoT device. As a specific example, correlating device features of a smart home automation light switch enables the data consolidation modules to communicate with the light switch and the interoperable rule modules to control and manage the light switch. The device identification module 312 can simplify the connectivity process of adding a new device by identifying the new device completely or partially without user input.

Identifying virtually and physically connected devices around a user or a place relevant to the user is an important component for the interoperability function. For example, the device identification module 312 may employ at least one of the following methods to identify the IoT devices 324: (a) device based identification, where unique IoT device identifier may be created based on the device's data elements; (b) protocol based identification, where unique device identifier may be created based on a device communication element or elements; (c) device and protocol based identification, where a combination of device data and communication protocol data may define the device identification; (d) device behavior based identification, where the device is identified based on its predefined or observed behavior, or any combination thereof. Behavior can be, for example, audible, visual, magnetic, electronic, motion, or any combination thereof. Behavior pattern can be passive or responsive to a command or stimulus. The device identification module 312 may recognize an IoT device behavior based on IoT device data, a test and verification command, or a context event associated with the IoT device. The test and verification command, for example, may include the device identification module 312 sending a blinking command to a connected light bulb in order to identify the exact bulb of multiple bulbs around. In this manner, the recognition of a context (e.g., behavioral context) and/or semantic circumstance of the IoT device (e.g., the light bulb) can define the unique identifier of the IoT device.

Device identification can be based on image recognition. Image-recognition-based device identification may be assisted by relevant data including contextual parameters from the data correlation module 306, the data analysis module 308, or both. For example, if the device identification module 312 analyzes a device and determines that the device may be either be a Samsung™ fridge or a Samsung™ TV, the device identity may be determined based on its geo-location context (e.g., if the device is in living room, then the device is a TV, and if the device is in kitchen, then the device is a fridge). In this case, for example, location may be determined through radio frequency (RF) beacons of other devices around or through geo-locating components. In the example of RF beaconing, if a microwave and coffee machine are detected around the device, then the device is probably in the kitchen. Location may further be assisted by semantic data. For example, if the device is proximate (e.g., within a distance threshold) to a bulb named by the user as "kitchen light", then the device is in the kitchen. Proximity may be estimated by distance through router signal strength indication (RSSI) or visual recognition.

Data Consolidation

Figure 7:
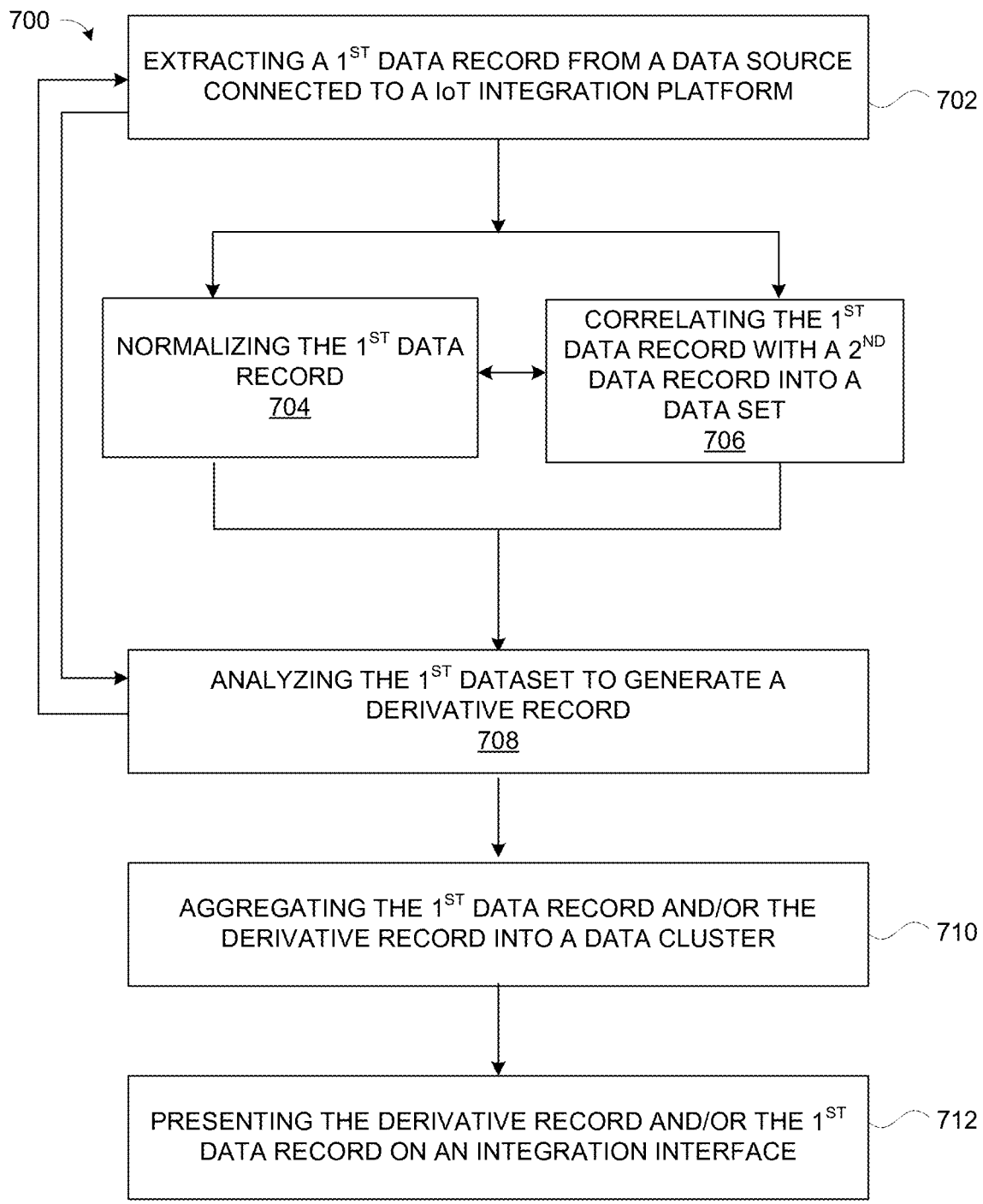
FIG. 7 is a flow diagram of a method of data consolidation, consistent with various embodiments of the disclosed technology.

The task of data consolidation may be divided into steps. For example, data consolidation may be performed in the following steps including: (1) data extraction, (2) data aggregation, (3) data normalization, (4) data correlation, (5) data analysis, and (6) data visualization. An example of the data consolidation flow is illustrated in FIG. 7. The integration backend system 302 and/or the integration application 328 may implement any combination of the steps for data consolidation. For example, when a user operates an activity tracker and a network scale, the integration platform 300 enables a consolidated interface to present a correlative view of the user's weight and activities in a meaningful manner to assist the user in monitoring his/her health. The combination of the above steps enables unique correlation features that have been discovered to be advantageous. The data consolidation steps enable contextual and semantic insights based on a multitude of sensor/measurement/semantic/analytical/user-reported/device status data, rather than just a listing of sensor data. For example, the data consolidation may provide the user with health related insights of himself (e.g., when the user goes to work using public transport, the user burns four times more calories than when driving a car to work). Thus, the data consolidation steps may be used to motivate the user to change habits and behavioral patterns that affect his/her fitness/health. The data correlation module 306 is configured to extract raw data from different sources, including the IoT devices 324. For example, the data correlation module 306 can receive data (e.g., real-time from continuous or discrete data stream, non-real-time data, device sensor data, user-device interaction dataset, user reporting dataset, or any combination thereof including metadata thereof) from the IoT devices 324. For example, the data may include measurements, user commands, or user-reported status updates. The data correlation module 306 may receive the datasets directly from the IoT devices or via reporting from the solution-specific application 222 or the integration application 328.

The data correlation module 306 may further be configured to extract raw data from an external source. For example, the raw data may be extracted from an online or virtual data source, such as a geo-location map, a social network, a calendar, a media network, or any combination thereof.

The data correlation module 306 may yet further be configured to extract data based on data analysis, such as the data analysis performed by the data analysis module 308. Data analysis may include semantic analysis and context awareness analysis. Further description of data generated from the data analysis module 308 is described herein.

The data correlation module 306 may be configured to aggregate the datasets into meaningful data buckets during the process of data collection. As data is extracted, the data is organized into the meaningful buckets (e.g., cluster). The data aggregation may be based on a time line, based on user, based on device type, based on user-defined groups, based on location, or any combination thereof.

The data correlation module 306 may be configured to normalize each of the datasets. For example, data along the same dimension may be normalized across time periods, across the data buckets through aggregation, or a combination thereof.

The data correlation module 306 may also be configured to correlate portions of the datasets with each other. Data correlation is an intelligent way of associating a portion of the datasets with another portion of the datasets. The data correlation may be based on time synchronization, shared social relation (e.g., devices are owned by user accounts in the same social group), shared data dimension (e.g., both devices measures weight), shared data source profile (e.g., location or device-type, etc.), data owner profile (e.g., user profile or user configurations), shared known semantic (e.g., both devices are considered "kitchenware"), shared known context (e.g., both devices are operated in the context of exercising), or any combination thereof.

For example, the data reported from a networked heating system may be correlated with the data reported from a networked thermometer based on a shared data dimension and a shared data source location. As another example, aggregated data reported from an exercise tracker on a first user may be correlated with an aggregated dataset of heart rate data of the first user (i.e., because of shared known context of "user health"). The aggregated dataset of heart rate data may in turn then be correlated with an aggregated dataset of user reported calorie count from the first user (i.e., because of shared known context of "user health").

The data correlation module 306 is configured to interface with the data analysis module 308. The data analysis module 308 is configured to determine a set of semantic or context data from the correlated datasets. Note that part of the correlated datasets may include semantic or contextual data already.

Semantic

The data analysis module 308 may determine semantic meaning to each of the IoT devices 324 and the data processed by the data correlation module 306. Initially, the IoT devices 324 do not have any assigned meaning to a user. For example, the IoT devices 324 are devices like switches, routers, light bulbs, fridge, TV, car, etc. However, to users, the IoT devices 324 symbolize more than just a bulb. Users prefer to use devices based semantic meanings of the devices. For example, an "X-Box" switch, "my home" router, "kitchen" light, "bathroom" light, "my parents'" fridge, and "kitchen" TV are all potential semantic labels that may assist a user when operating a set of IoT devices 324. The semantic labels on the IoT devices 324 may also assist the data analysis module 308 to better understand the context of the user's intentions. For example, a "front door" may be in a context with different default behaviors or interoperable rules than a "bedroom door." Similarly, data generated through these semantically labeled IoT devices 324 may also be semantically labeled. The data analysis module 308 may implement semantic learning to each user's devices based at least one or more of the following methods:

User-based: Semantic meaning may be defined by a user. A user may submit through the solution-specific application 322 or the integration application 328 that a specific device is connected to another device. For example, the user may submit through the client interface that a switch is connected to a game console X-Box, and hence the switch may be labeled the "X-box switch."

Device-based: Semantic meaning may be determined via an adaptive correlation mechanism as implemented through the data correlation module 306 described above. Through network scanning techniques, the adaptive correlation mechanism may identify that the user's smartphone sees the specific light bulb always at the same time when a fridge is also identified. The adaptive correlation mechanism may learn that the light bulb has significant meaning together with the fridge. Such a correlation of data enables an understanding that the light bulb is very close to the fridge. The data analysis module 308 can then adopt an existing semantic meaning of the fridge being in the "kitchen" to the specific light bulb (i.e., labeling the light bulb as the "kitchen" light bulb).

Behavior profile based: The data analysis module 308 may profile user's behavioral patterns and identify places, devices and people that a user is connected to during his/her day. For example, when a user is connected to IoT devices always or highly frequently during working days from a specific router or a geo-location, then the data analysis module 308 may label the IoT devices with a semantic meaning of being a "work" device based on association the specific router or with a geolocation of work.

Context Awareness

Through semantic awareness and devices' interoperability, the data analysis module 308 may recognize the context between and/or amongst devices, people, places and time. Context may be organized semantically for ease of comprehension by the user of the integration platform. Context may work to approximate or describe a real-life situation, place, event, or people based on datasets collected from the IoT devices or other nodes (e.g., social network, external user-associated accounts, or geographical databases). Context may work to predict a future situation based on datasets collected from the IoT devices. Context may answer questions, such as who is doing what activity at when and where, and why is the activity being done. For example, the context of "mother is cooking dinner in the kitchen tonight" may be detected by activation of mother's cellphone near a networked oven that is also activated. Context awareness mechanisms of the data analysis module 308 may be derived through one or more of the following methods:

Behavior profile based: The data analysis module 308 may derive at a particular context through device behavior analysis. For example, "finished running", "child arrives home from school" awareness are recognized based on devices behaviors including when exercise tracker stopped registering movement or when a smart TV is tuned to a cartoon channel at home in the afternoon.

Socially-based: The data analysis module 308 may derive at a particular context through interaction with social graph data from a social network associated with a user account. For example, when users communicate to their friends via a social network, a matching mechanism can be applied to assign awareness of a friendship relationship to the devices of the user's friends. A semantic label of a "friend Erica's smart watch" may be assigned to a wearable device registered to a friend of the user named "Erica". Henceforth, any activity observed through the smart watch may have a social context to the user as an activity performed by the friend "Erica". As another example, when a device registered to "Erica" (e.g., the device is frequently or always with "Erica") is detected in the vicinity of the user's active region (e.g., where the data analysis module 308 has determined the user to be or location of a networked door of a registered home to the user), the data analysis module 308 may register a contextual event of "Erica is at the door."

Geo-location based: The data analysis module 308 may further identify geo-locations of multiple devices' activities to determine location context. In each network scanning event of a connected IoT device, a geolocation (longitude, latitude, accuracy) may be collected. Therefore, each IoT device and/or IoT device activity can have a geolocation history that defines the device's geolocation context. Geo-location, for example, may be reported via a global positioning system (GPS) component or a network module (e.g., via network source triangulation) of the IoT devices 324.

The data analysis module 308 may also determine the geo-location of an IoT device by generating and maintaining an in-door navigation map. Techniques, such as GPS geo-location and/or cellular network-based geo-location navigation systems, may not be as effective or readily available (e.g., due to low signal strength) while in-doors for positioning people and devices. In one embodiment, an in-door geo-location solution may include special hardware systems that are placed inside the building for indoor geo-location and navigation.

A preferred solution may include geo-location via local network connections without additional special hardware systems. In various embodiments, a directory of connected devices that belong to the user may be kept in a database store coupled to the data analysis module 308. The directory along with beacon signal from Bluetooth or WiFi may be used to estimate the position of a user indoors. For example, for each Wi-Fi network router scanning, the GPS geolocation and RSSI may both be collected through the data correlation module 306 or the data analysis module 308. The RSSI enables the data analysis module 308 to position local networking devices (e.g., routers, access points, or switches) relatively to each other in every specific geo-location point. Each IoT devices connected to the indoor network (e.g., Wi-Fi) through its visibility position relative to the local networking devices in every moment may thus enable locating of the user and IoT device activities in-house.

The data analysis module 308 may calculate the set of context in real-time as data is reported from the IoT devices. Absolute and/or relative timing of IoT device data may be used for temporal context. For example, the data correlation module 306 may correlate IoT device activation times from IoT devices in the same room. The data analysis module 308 can then compute a user relevant context from the device activation times. For example, if the IoT device activation times are close to one another within a predetermined time period in the morning, the data analysis module 308 may record a "user has woken up" context. As another example, if IoT device disconnection times for IoT devices within the same room are simultaneous within a very close margin, the data analysis module 308 may record a "blackout" context. This "blackout" context may be differentiated from when the IoT device disconnection times are sequential instead of simultaneous. As yet another example, a sequential turning off of IoT devices may signal a "user getting ready to sleep" context or "user leaving home" context.

Correlative Insights

Figure 10A:
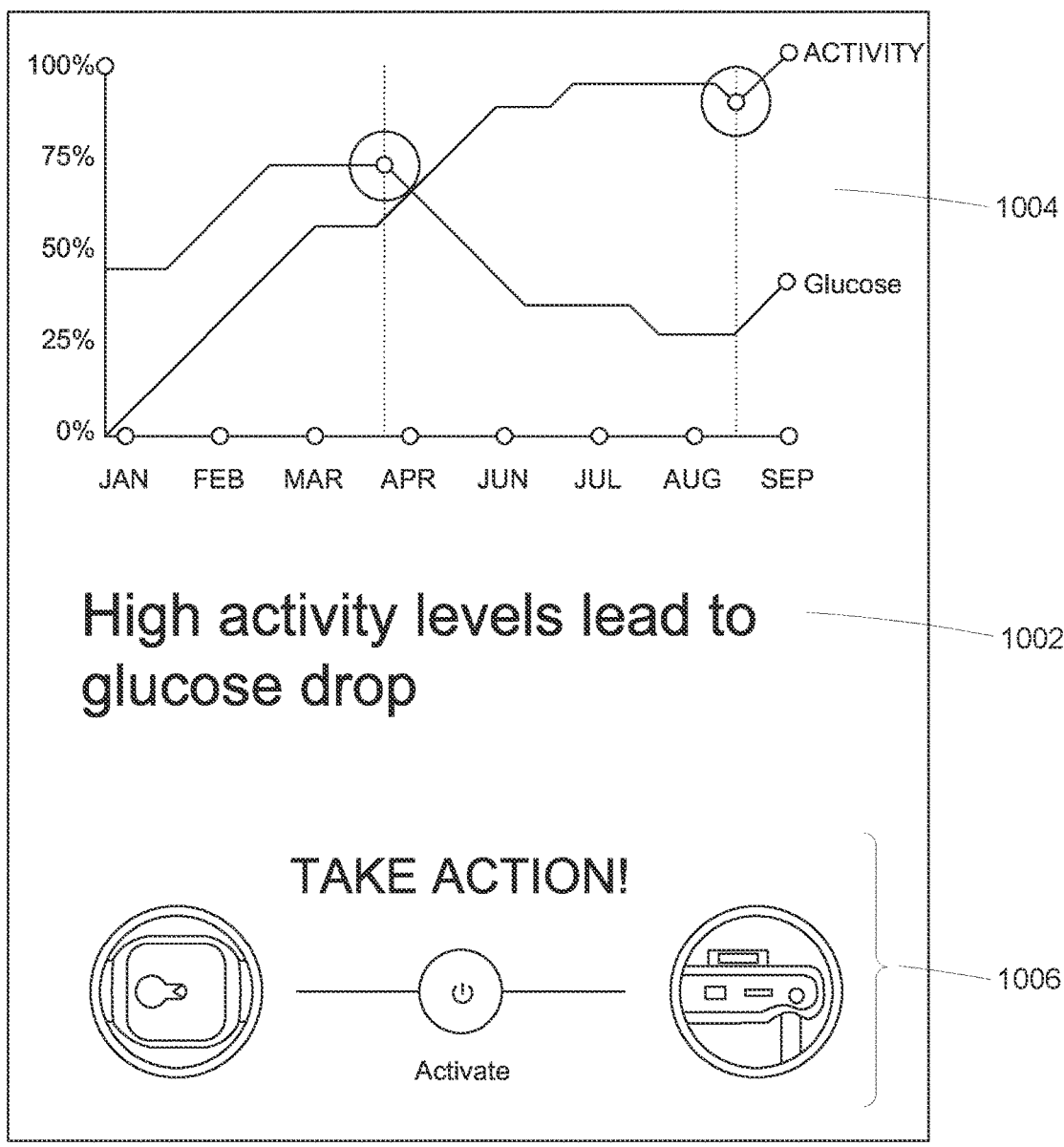
FIG. 10A is an exemplary screen shot illustrating the consolidation interface showing a correlative insight, consistent with various embodiments of the disclosed technology.
Figure 10B:
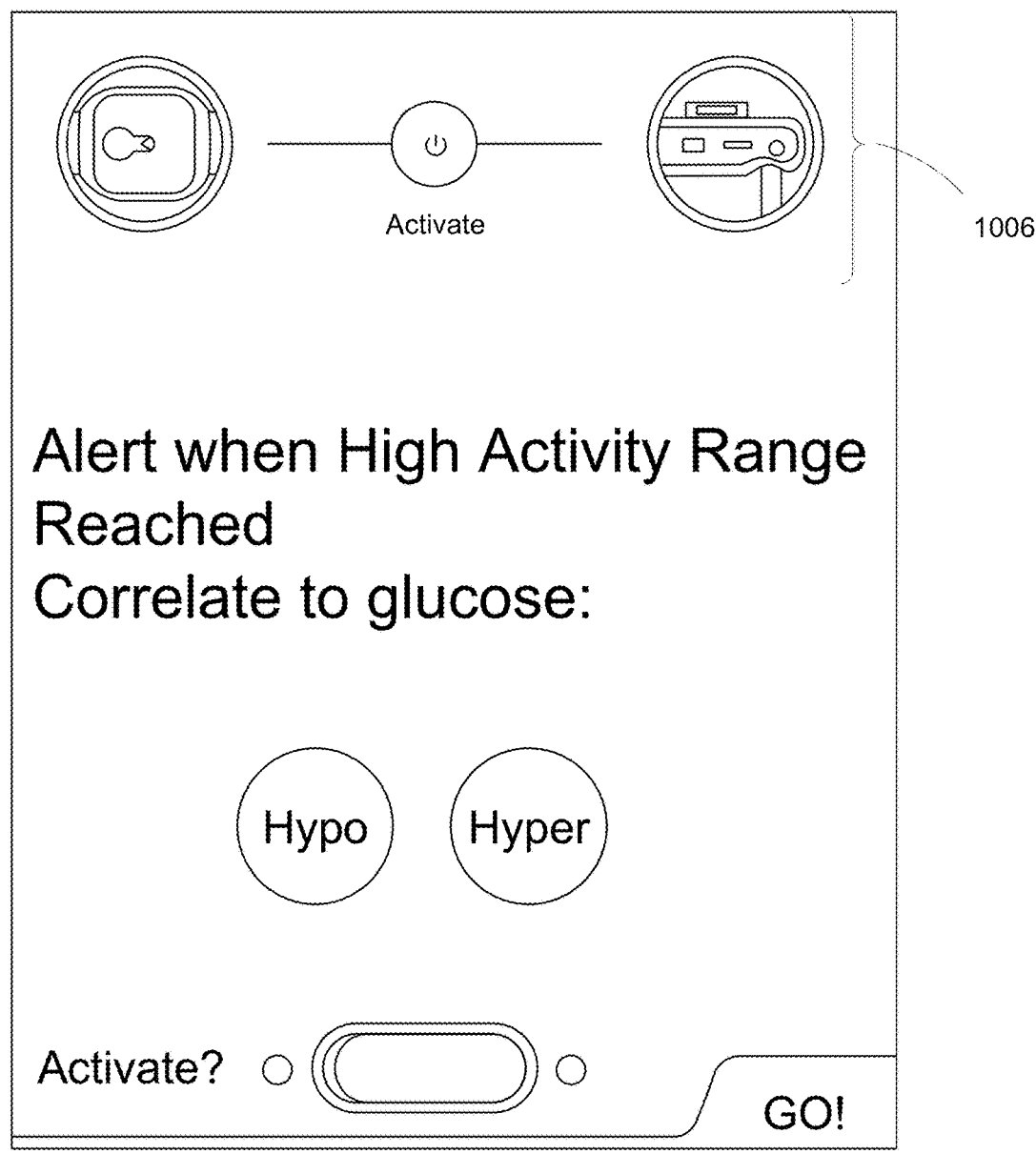
FIG. 10B is an exemplary screen shot illustrating the consolidation interface generating an interoperable rule from the correlative insight, consistent with various embodiments of the disclosed technology.

Correlative insights may also be determined by the data analysis module 308. The correlative insights are actionable insights for facilitating the user to make decisions regarding what action(s) to take. FIGS. 10A-10B illustrate examples of how the correlative insights may be shown on a consolidated interface generated by the consolidation interface generator module 304. For example, the data correlation module 306 may be able to collect a first data set of glucose level data from a wearable device of a user. The data correlation module 306 may also be able to collect a second data set of activity level data from another wearable device of the user. The data correlation module 306 may then correlate the two datasets. The data analysis module 308 may determine a correlative insight that "high activity level leads to sudden drop in glucose level." This correlative insight may then be used to generate interoperable rules to notify the user to stop exercising after a certain activity level is reached in order to avoid sudden drops in glucose level.

The consolidation interface generator 304 is configured to provide a consolidation interface to access and/or manage IoT devices connected to the integration platform 300. The consolidation interface generator 304 enables consolidation of connected devices for a consumer/user to a single client interface. The single client interface may be presented on the integration application 328 or any other network device capable of accessing the web and connect with the integration backend system 302. The consolidation interface generator 304 may also be configured to provide access to real-time or non-real-time data captured by one or more of the IoT devices.

Figure 4:
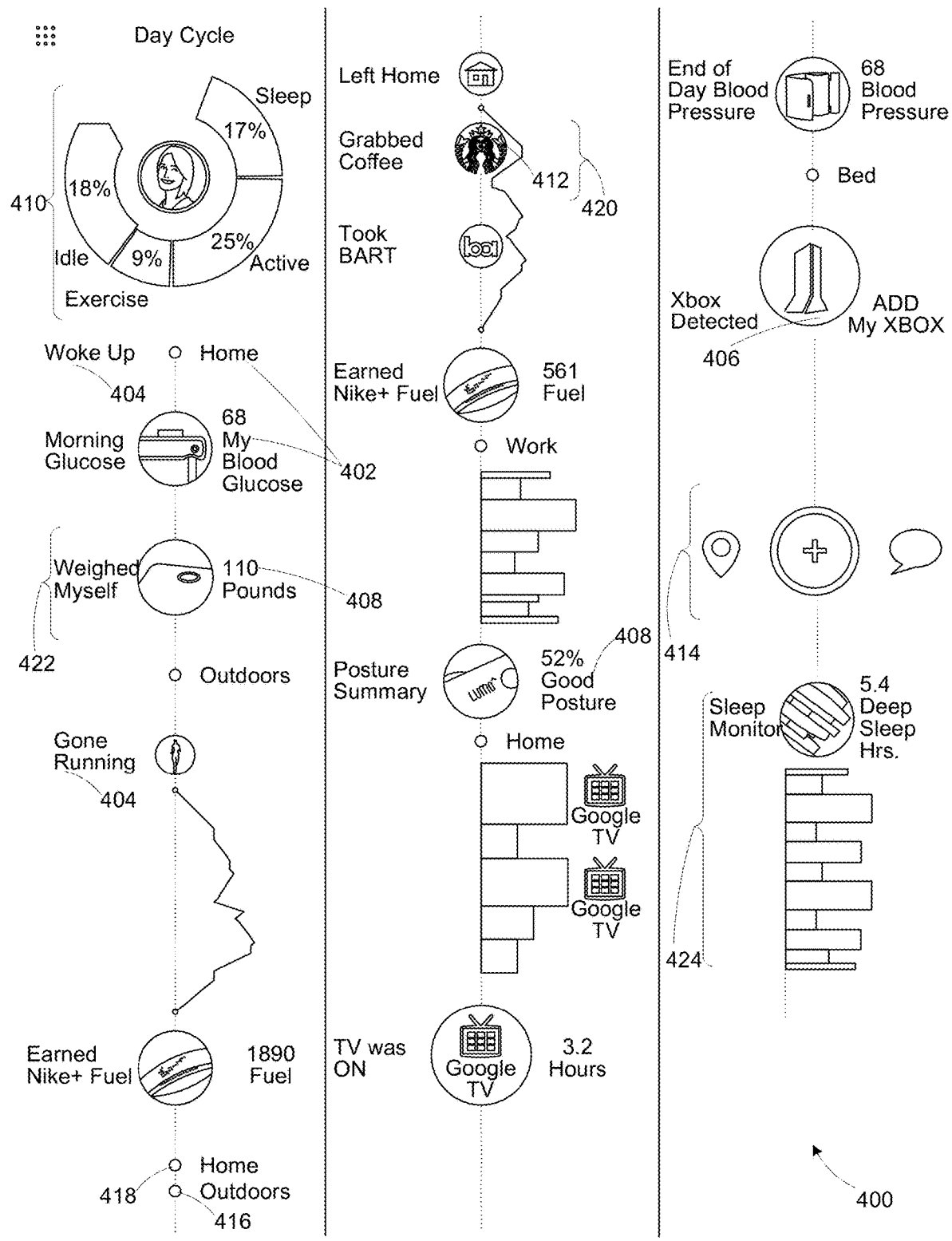
FIG. 4 is an example of an user interface illustrating an active lifeline diagram for a user account on an integration interface, consistent with various embodiments of the disclosed technology

As a specific example, the data correlation module 306 may aggregate data to generate a "life line" to be presented through the client interface generated by the consolidation interface. The "life-line" may serve as an automated diary related to a user as illustrated in FIG. 4. A users' daily activities and events may all or partially be correlated together in the order of the time of the day.

The "life line" may include context events determined by the data analysis module 308 as well as data from the IoT devices. The "life line" may be accessible to the user and/or social connections (e.g., friends in a social network) of the user through the consolidation interface. The "life line" may provide a big picture view for the user to visualize relevant correlated datasets related to him/herself. The "life line" may tag IoT device data in a timeline automatically based on a context-relevancy determination by the data analysis module 308 or based on user interaction. The "life line" may also be a motivator for collection of semantic data from a user. For example, when a user spent a considerable large amount of time in a place, the data correlation module 306 can collect and correlate data associated with a default name "place in Menlo park." The user may then be motivated to correct the semantic label to "home."

For example, users may be able to see a life log with places the user has been, activity tracking data, health statuses, calendar events, weather data—all data correlated together over the timeline of the day. Additionally, the user may be able to add his/her custom events on the "life line". The "life-line" is thus user specific. The accessibility and/or configurability of the "life-line" may be secured via privacy settings per user. Data (e.g., measurements, commands, status updates, and etc.) coming from the IoT devices 324 may be aggregated, analyzed, and/or correlated via the data correlation module 306 and/or the data analysis module 308. An advantage of the data analysis and data correlation is generation of one or more layers of contextual, correlative, and/or semantic insights, trigger events, and/or actions. The data analysis module 308 may apply machine learning on the analyzed and/or correlated data coming from the three layers described above and create a sense of "cognition"—understanding of contextual, correlative, and/or semantic events in a user's life. These layers enable predictive or reflective comprehension of user and/or IoT device behavior patterns and/or trends, and may further enable synthesis of generalizations of user and/or IoT device activity or need.

Detection of contextual events may be useful as evident below for the purposes of generating and executing interoperable IoT device rules, such as for the use by the rule generation module 310, the rule execution module 314, and the event track module 316. For example, when the friend's (e.g., Erica's) activity tracker is close to the connected door lock of the user, and the user has given permissions, then the connected door lock can open automatically by recognition of a social context of a "friend at my home next to my connected door."

Interoperability—Rule Generation and Execution

It has been discovered that interoperability is a significant part of consolidation of vertical solutions for IoT devices. Interoperability functions may be implemented through the rule generation module, the device identification module 312, the rule execution module 314, and/or the event track module 316. Interoperability enables creation of logical connections between the connected IoT devices. For example, when a user turns off his office lights and leaves the work, then his home temperature may be set automatically for a desired temperature. The logical connections between the connected IoT devices may be created through users' natural languages. For example, a logical IoT devices rule may be implemented through a natural language indication by "when I leave home, turn off my lights and start my Roomba vacuum cleaner" or "when I finish exercising, then cool down my car".

Once a logical connection is defined, the logical connection can take place based on defined interoperable rules without any user interference. The interoperability functions may be based on a trigger-action mechanism responsible for creating (e.g., the rule generation module 310), storing (e.g., the rule generation module 310), validating (e.g., the rule generation module 310), tracking (e.g., event track module 316), and activating (e.g., the rule execution module 314) the interoperable rules. For example, the rule generation module 310 may create, store, and confirm a context event based rule with the user. The event track monitor 316 may, for example in substantially real-time or periodically, recognize context triggered conditions (e.g., "I left home"; "finished exercising", or "Erica entered to the kitchen"). The rule execution module 314 may then execute the context event based rule when the context triggered condition is satisfied.

As an example, the rule generation module 310 may have created a context-based rule of "if user left the house then turn off all in-house devices." The event track module 316 through the data analysis module 308 may be able to detect in real-time that a "user has left the house" context at time point $T_1$. Thus in response to the detection of the conditional event at time $T_1$, the rule execution module 314 may execute multiple shutdown commands to multiple IoT devices at the user's home address.

As another example, an interoperable rule may be an authentication condition coupled to unlocking of a connected security device (e.g., a network enabled door). The authentication condition, for example, may be a contextual event of "a friend coming over to my house." The event track module 316 may detect this contextual event when a friend's activity tracker device nears the connected door of the user. In this example, the geo-location of the connected activity tracker or other wearable devices of the friend can be used as the basis of confirming the authentication condition. The authentication condition may include multiple other factors, including geo-location proximity of a second and/or a third device belonging to the user or the user's friend, including smartphones or mobile devices. The rule generation module 310 is configured to facilitate creation of rules to control the IoT devices. The rule generation module 310 may couple to a rule management interface. The rule management interface may be part of the consolidation interface generated by the consolidation interface generator 304. The rule management interface may be part of the consolidation interface generated by the consolidation interface generator 304. Rules may be configured by a user or automatically determined by the rule generation module 310. When a rule is determined by the rule generation module 310, the rule is shown as a recommendation. The recommendation is then suggested through the consolidation interface for validation by the user. The rules may be stored on the integration backend system 302 or on an IoT device associated with a user who created or validated the rule.

The rules may include conditionals based on events, context, user trigger, time trigger, or any combination thereof. The rule generation module 310 may be coupled a rule management interface that enables selection(s) of a conditional followed by selection(s) of a command. A rule recommendation may be determined by an adaptive learning mechanism, such as by user behavior pattern (e.g., every morning the user turns on the air conditioning to 70 degrees), by user-profiling (e.g., other users of the same age and/or gender prefer to have a health report aggregated from health-related IoT devices and therefore a rule to generate a health report is created), or by social triggers (e.g., a friend who owns a Tesla decides to send over his IoT device rules associated with owning a Tesla).

A user is able to define the interoperability between his IoT devices according to his will, preference, habits, and/or desire of automation or any other type of motivation. Based on users' behaviors and users' profiling, the adaptive learning mechanism may recognize user's behavioral routine patterns and offer to a user to add an interoperable logical connection (i.e., IoT interoperable rule) between his/her connected devices. For example, the data correlation module 306 and the data analysis module 308 can recognize that every morning a user starts the coffee machine, turns on the music, leaves a house, and turns off all lights and thermostat. This sequence of IoT device commands to the coffee machine and the music player may be a recommended rule triggered by a context event of the user waking. The IoT device commands to the thermostat and the lights may be triggered by the context event of the user leaving the house. Users may also recommend the interoperable logical rules to their friends through any communication channel, e.g., social networks, emails, cellular messages, instant messages, or any combination thereof.

The event track module 316 is configured to synchronize execution of rules based on events. When the interoperable IoT rules are generated, execution of the rules may be based on a variety of conditional events. For example, the conditional events may include context-based events, device-state-based events, absolute or relative time-based events, socially triggered events, user profile triggered events, user behavior/interaction triggered events, or any sequential or parallel combination thereof. The event track module 316 may interface with the data analysis module 308 to detect the context-based events and execute context-based rules generated by the rule generation module 310. The event track module 316 may detect conditional events in the connected IoT devices 324 based on polling the connected IoT devices 324, or based on interrupts received from the IoT devices 324, the solution specific application 322, and/or the integration application 328.

In various embodiments, the event monitoring mechanism of the event track module 316 may be implemented on the integration application 328, the integration backend system 302, the IoT devices 324, or a combination thereof. When some logic of the event track module 316 is implemented on the IoT devices 324 or the integration application 328, the event track module 316 may be able to detect condition events based on interrupts instead of polling.

The implementation of the interoperable rule validation, tracking and execution may be distributed. For example, the implementation of the interoperable rules may be based on a distributed mesh model in communication with a central cloud service system (e.g., the integration backend system 302). In various embodiments, every user running the integration application 328 can validate, track, and execute interoperable rules, even if the interoperable rules do not belong to the user. For example, if a user lost a Bluetooth tagged keychain, the integration platform 300 may try to scan proximal environments of other users' devices for the user's keychain. Identifiers from the other users' devices may remain anonymous and/or encrypted for privacy reasons. The final location of the keychain is also shielded from access by the other users even if the other users' devices contributed to the locating of the keychain. An anonymized identifier may then be transferred to the integration backend system 302 to inform the user that the key chain is found.

The rule execution module 314 is configured to execute an interoperability logical rule through the IoT devices 324, the integration backend system 302, the integration application 328, the solution-specific applications 322, the solution-specific backend systems 320, or any combination thereof. The rule execution module 314 may be configured to communicate with the above systems through the communication interface module 318 to enable communication between all of the above devices, applications, and systems. The rule execution module 314 may also synchronize execution of commands related to multiple IoT devices. In various embodiments, similar to tracking of the trigger conditions, the execution of commands may also be distributed, including via devices owned by a user who is not the owner of the interoperable rule. In various embodiments, each user who owns devices may enable permission settings that allow other users to use the owned devices for tracking or execution of interoperable rules.

Blocks, components, and/or modules associated with the IoT integration platform system 300 may be implemented as hardware modules, software modules, or any combination thereof. For example, the modules described can be software modules implemented as instructions on a tangible storage memory capable of being executed by a processor or a controller on a machine. The tangible storage memory may be a volatile or a non-volatile memory. In some embodiments, the volatile memory may be considered "non-transitory" in the sense that it is not a transitory signal. Software modules may be operable when executed by a processor or other computing device, e.g., a single board chip, a field programmable field array, a network capable computing device, a virtual machine terminal device, a cloud-based computing terminal device, or any combination thereof.

Each of the modules may operate individually and independently of other modules. Some or all of the modules may be executed on the same host device or on separate devices. The separate devices can be coupled via a communication module to coordinate its operations. Some or all of the modules may be combined as one module.

A single module may also be divided into sub-modules, each sub-module performing separate method step or method steps of the single module. In some embodiments, the modules can share access to a memory space. One module may access data accessed by or transformed by another module. The modules may be considered "coupled" to one another if they share a physical connection or a virtual connection, directly or indirectly, allowing data accessed or modified from one module to be accessed in another module. In some embodiments, some or all of the modules can be upgraded or modified remotely. The IoT integration platform system 300 may include additional, fewer, or different modules for various applications.

FIG. 4 is an example of a user interface illustrating an active lifeline diagram 400 for a user account on an integration interface, such as the integration interface 114 of FIG. 1 or the integration application 328 of FIG. 3, consistent with various embodiments of the disclosed technology. The active lifeline diagram 400, for example, may be part of the consolidation interface generated by the consolidation interface generator 304 of FIG. 3. The active lifeline diagram 400 may be accessible through the integration application 328.

As shown, the active lifeline diagram 400 illustrates a single day of a user, organized by when the user woke up to when the user went to sleep. Although the active lifeline diagram 400 has been illustrated for a time period of a single day, the user may define the length of the history data to any time period. In various embodiments, the user may scroll back between consecutive time periods along the lifeline diagram 400. The active lifeline diagram 400 includes illustrations of semantic labels 402, contextual events/activities 404, icons of relevant IoT devices 406, relevant IoT device data 408, correlated contextual data 410, and externally sourced data 412, such as data source from a social network status report.

As a specific example, the correlated contextual data 410 may represent a user interface element on the top of the lifeline diagram 400 that enables tagging of activities or postings specific to fitness activity contextual labels (e.g., sleep, idle, active, and exercise). As another example, the icon of the relevant IoT device 406 is illustrated along with a contextual event that a new device and a new semantic label have been added for "My XBOX."

The active lifeline diagram 400 may respond and visualize correlative insights according to periodic or real-time data, or context updates, enabling users of the active lifeline diagram 400 to take action based on the insights. The active lifeline diagram 400 may also enable a user to tag or post his/her own updates as part of a life-logging mechanism. An example of a semantic camera interface to facilitate the life logging is illustrated in FIGS. 11A-11D. For example, the active lifeline diagram 400 may be advantageous in achieving a health action plan with live feedback information. This is a significant step-up from a mere lifestyle blog. The active lifeline diagram 400 may not only consolidate lifestyle and daily routine data (e.g., exercise and performance data) relating to fitness activities, but may also correlate a user's lifestyle habits and daily routine with a context of how healthy the user is based on numerous measurements and reports.

Elements of the lifeline diagram 400 may be divided into at least the following categories: life logging posts 414, type A elements 416, type B elements 418, type C elements 420, type D elements 422, type E elements 424, or any combination thereof. A life log post 414 is a user reported post or tag on the lifeline diagram 400. For example, the life logging posts may follow the following rules. A "+" sign may appear at the top of the lifeline when there is no other activity, on idle time, or when there is no other notification, element, or correlation within the same time period. When the plus sign is tapped, the posting options may appear. When choosing the post option, the plus sign may change to a camera icon enabling the semantic camera interface described in FIGS. 11A-11D. An editable text may appear on the left of the plus sign, such as "what is on your mind?" to request the user to specify an activity or a topic, or "what is this place?" to request the user to specify a location. If the user is idle and does not edit or take a photo for more than a threshold number of seconds, such as three seconds, then the post becomes a C type element 420, and the plus sign re-appears.

A type A element 416 is an activity or event where the place and description text is a predefined by the integration platform 300. However, a user may edit the text of the type A element 416 (e.g., by tapping once). The edited text may be returned to the integration platform 300, such as the integration backend system 302 for future rendering of the lifeline diagram 400. A type B element 418 is a node on the lifeline diagram 400. The node image may be defined by the integration platform 300, where the images may be cached off-line. The description text may be predefined by the server and editable by the user similar to the type A element 416. Again, the edited text may be returned to the integration platform 300.

A type C element 420 is a node on the lifeline diagram 400, where the node is represented by an iconic image. The default iconic image may be received from the integration backend system 302. However, the user may tap the iconic image to take and upload a picture to the integration backend system 302. A type D element 422 is a node on the lifeline diagram 400, where the node is associated with an activity, a contextual icon, and a display of data. A type E element 424 is a node on the lifeline diagram 400, where the node is a data representation diagram. The user may configure how the data come from the integration backend system 302. The user may also configure how the data is represented in the data representation diagram.

Figure 5:
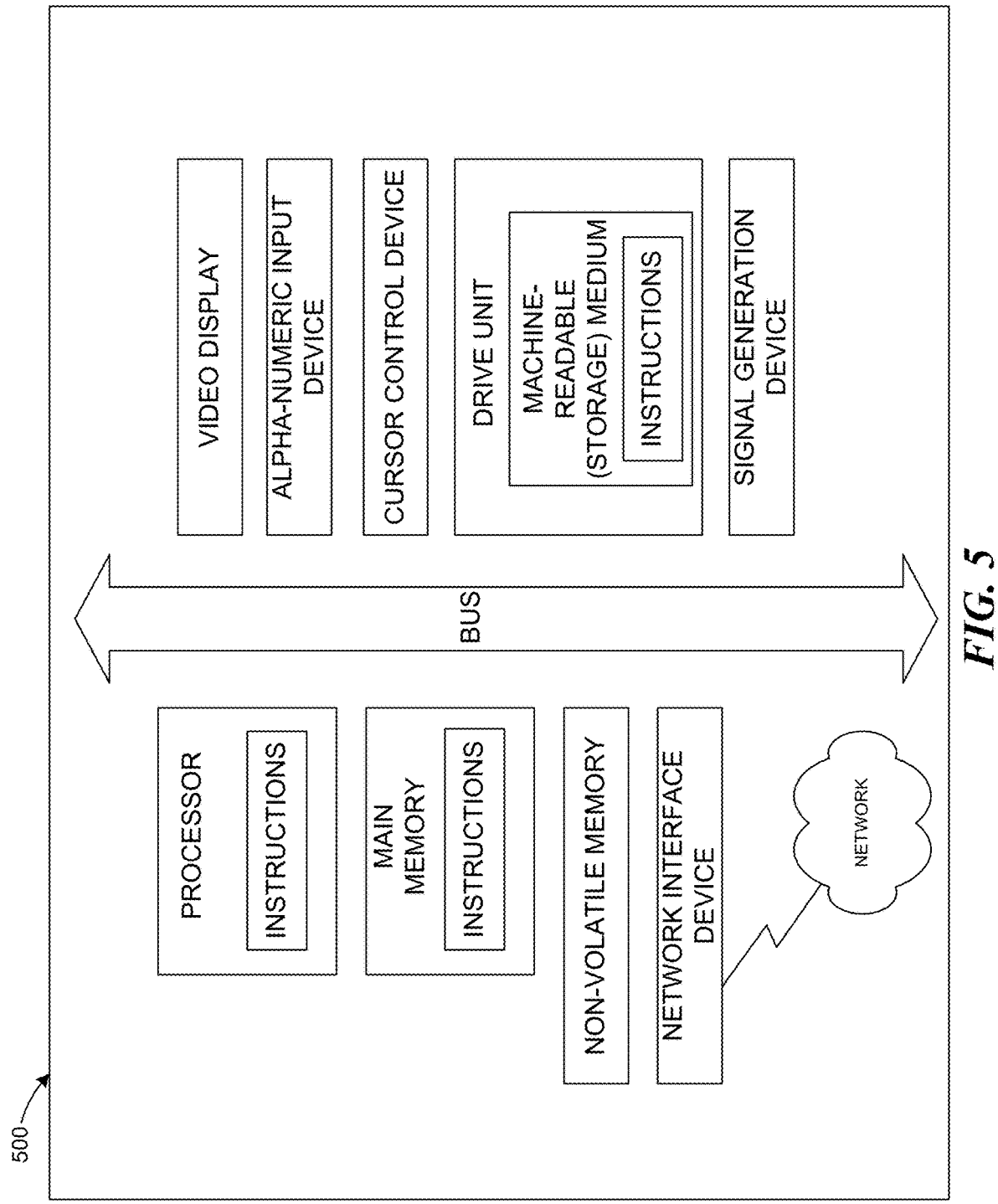
FIG. 5 is a diagrammatic representation of a machine in the example form of a computer system within which a set of instructions, for causing the machine to perform any one or more of the methodologies or modules discussed herein, may be executed.

Referring now to FIG. 5, therein is shown a diagrammatic representation of a machine in the example form of a computer system 500 within which a set of instructions, for causing the machine to perform any one or more of the methodologies or modules discussed herein, may be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the modules or components depicted in the example of FIG. 2 or FIG. 3 (and any other components described in this specification) can be implemented. The computer system 500 can be of any applicable known or convenient type. The components of the computer system 500 can be coupled together via a bus or through some other known or convenient device.

This disclosure contemplates the computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Figure 6:
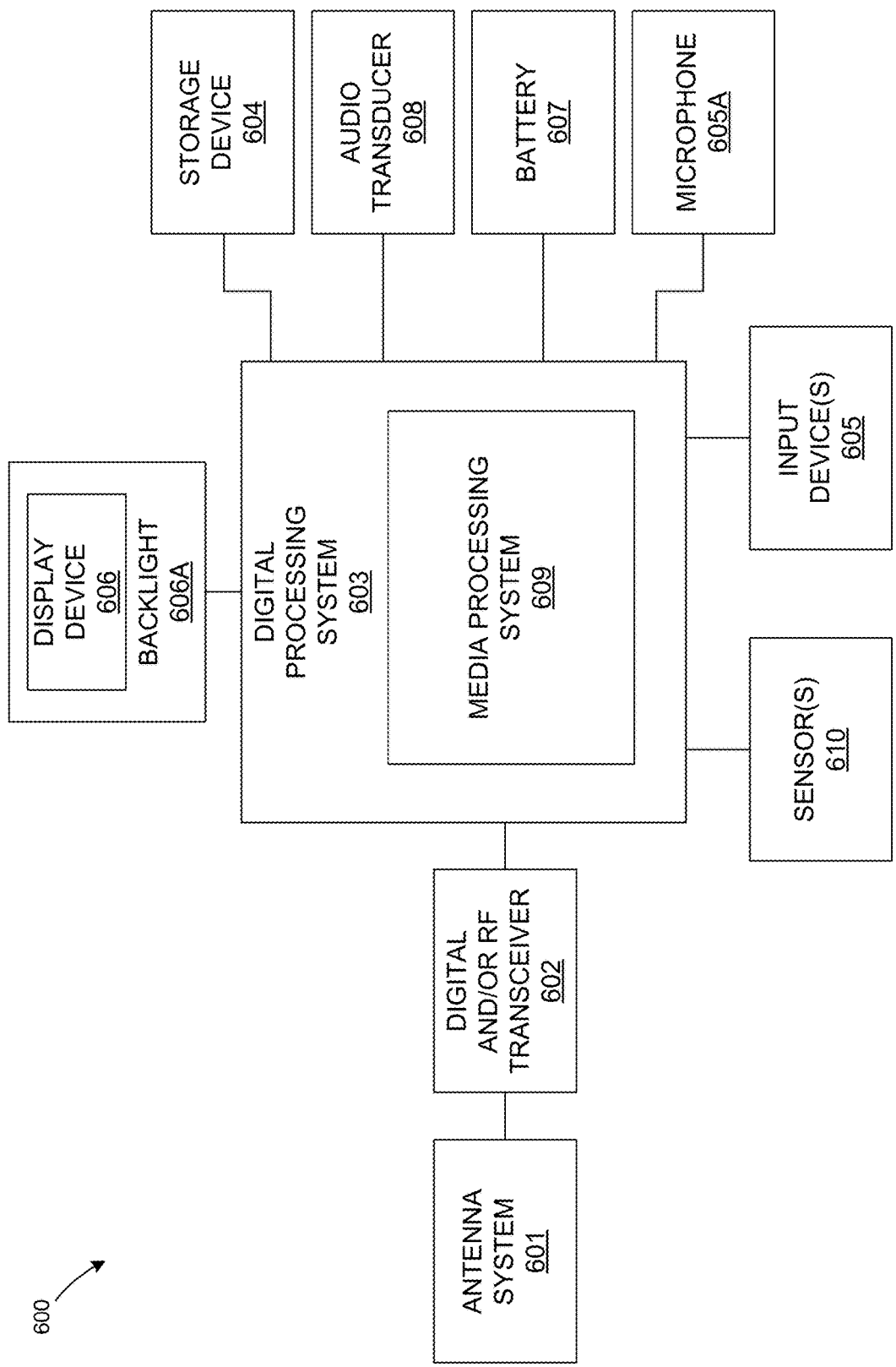
FIG. 6 is a diagrammatic representation of a wireless device.

FIG. 6 shows an embodiment of a wireless device 600 which includes the capability for wireless communication. The wireless device 600 may be included in any one of the devices shown in FIG. 2, although alternative embodiments of those devices may include more or fewer components than the wireless device 600.

Wireless device 600 may include an antenna system 401. Wireless device 600 may also include a digital and/or analog radio frequency (RF) transceiver 602, coupled to the antenna system 601, to transmit and/or receive voice, digital data and/or media signals through antenna system 601.

Wireless device 600 may also include a digital processing system 603 to control the digital RF transceiver and to manage the voice, digital data and/or media signals. Digital processing system 603 may be a general purpose processing device, such as a microprocessor or controller for example. Digital processing system 603 may also be a special purpose processing device, such as an ASIC (application specific integrated circuit), FPGA (field-programmable gate array) or DSP (digital signal processor). Digital processing system 603 may also include other devices, as are known in the art, to interface with other components of wireless device 600. For example, digital processing system 603 may include analog-to-digital and digital-to-analog converters to interface with other components of wireless device 600. Digital processing system 603 may include a media processing system 609, which may also include a general purpose or special purpose processing device to manage media, such as files of audio data.

Wireless device 600 may also include a storage device 604, coupled to the digital processing system, to store data and/or operating programs for the wireless device 600. Storage device 604 may be, for example, any type of solid-state or magnetic memory device.

Wireless device 600 may also include one or more input devices 605, coupled to the digital processing system 603, to accept user inputs (e.g., telephone numbers, names, addresses, media selections, etc.) Input device 605 may be, for example, one or more of a keypad, a touchpad, a touch screen, a pointing device in combination with a display device or similar input device.

Wireless device 600 may also include at least one display device 606, coupled to the digital processing system 603, to display information such as messages, telephone call information, contact information, pictures, movies and/or titles or other indicators of media being selected via the input device 605. Display device 606 may be, for example, an LCD display device. In one embodiment, display device 606 and input device 605 may be integrated together in the same device (e.g., a touch screen LCD such as a multi-touch input panel which is integrated with a display device, such as an LCD display device). The display device 606 may include a backlight 606A to illuminate the display device 606 under certain circumstances. It will be appreciated that the Wireless device 600 may include multiple displays.

Wireless device 600 may also include a battery 607 to supply operating power to components of the system including digital RF transceiver 602, digital processing system 603, storage device 604, input device 605, microphone 605A, audio transducer 608, media processing system 609, sensor(s) 610, and display device 606. Battery 607 may be, for example, rechargeable or non-rechargeable lithium or nickel metal hydride battery. Wireless device 600 may also include audio transducers 608, which may include one or more speakers, and at least one microphone 605A. In certain embodiments of the present disclosure, the wireless device 600 can be used to implement at least some of the methods discussed in the present disclosure.

FIG. 7 is a flow diagram of a method 700 of data consolidation, consistent with various embodiments of the disclosed technology. The method 700 includes extracting a first data record (e.g., a data entry, measurement, stream, etc.) from a data source connected to an IoT integration platform, such as the IoT integration platform system 200 of FIG. 2 or the integration platform 300 of FIG. 3, at a step 702. The data source may be an external data source, data reported from one or more IoT devices, or analyzed and/or correlated data based on the above, such as contextual data, correlations, semantic data, or other metadata. The step 702 may include determining a unique identifier of a first IoT device, where the first IoT device is the data source. The step 702 may be performed by the data correlation module 306 of FIG. 3.

Optionally data records may be normalized. For example, the first data record may be normalized with respect to other data record along a same data dimension at step 704. The step 704 may be performed by the data correlation module 306 as well.

Part of the data consolidation also includes correlating the data records and analyzing the data records to determine semantic label, context, and/or relevancy. For example, the data correlation module 306 may correlate the first data record with a second data record into a data set at a step 708. The data correlation may be based on a shared data dimension, a shared data context, a shared data source, a shared relevancy topic, a shared data semantic label, or any combination thereof. Optionally, the step 704 and the step 706 may be skipped prior to the data correlation.

The data analysis module 308 may analyze the first data record to generate a derivative record relevant to a user context at a step 708. The data analysis at the step 708 may be performed on the correlated data records in the data set generated at the step 706. Alternatively, the data analysis may also be performed directly on the extracted first data record and/or the normalized first data record of the steps 702 and 704, respectively.

The derivative record may include determination of a context of an IoT device activity. The derivative record may include determination of a semantic label for an IoT device associated with the first data record. The derivative record may include other predictive, trending, and/or comparative analytics. The derivative record may be used in another instance of the data consolidation flow as the extracted data record, such as in the step 702. The derivative record may be formatted as a natural language statement in any number of languages, such as the user's natural language.

After the above steps, different data records and data sets may be aggregated into a data cluster for a particular contextual relevant grouping, such as aggregating the first data record into a data cluster at step 710. The derivative record may also be aggregated into the data cluster. The data cluster may represent an aggregation of data that is beyond correlated. For example, a heart rate monitor data record may be correlated at the step 706 with a glucose level monitor data record because of a shared semantic and context of health related data. However, this health related data may be aggregated into a data cluster for other non-health-related activities on the same day because the relevant grouping of the data cluster pertains to the activities of the day.

After the above steps of data processing, the derivative record and/or the first data record is presented (e.g., visualized or audibly presented) on an integration interface for the user at a step 712. The first data record and/or the derivative record may be presented on the integration interface along with other data sets or data records of the data cluster. The context indication may be determined based on the derivative record from the step 714. The visualization may also include comparative visualization, semantic visualization, or topical visualization (e.g., based on topical relevancy). The visualization may present the first data record within the aggregated data cluster. The visualization may present the first data record after the first data record is normalized. The visualization may present the first data record and the correlated second data record simultaneously together for illustrating the shared data category or the shared context, such as the context from the context indication.

Figure 8:
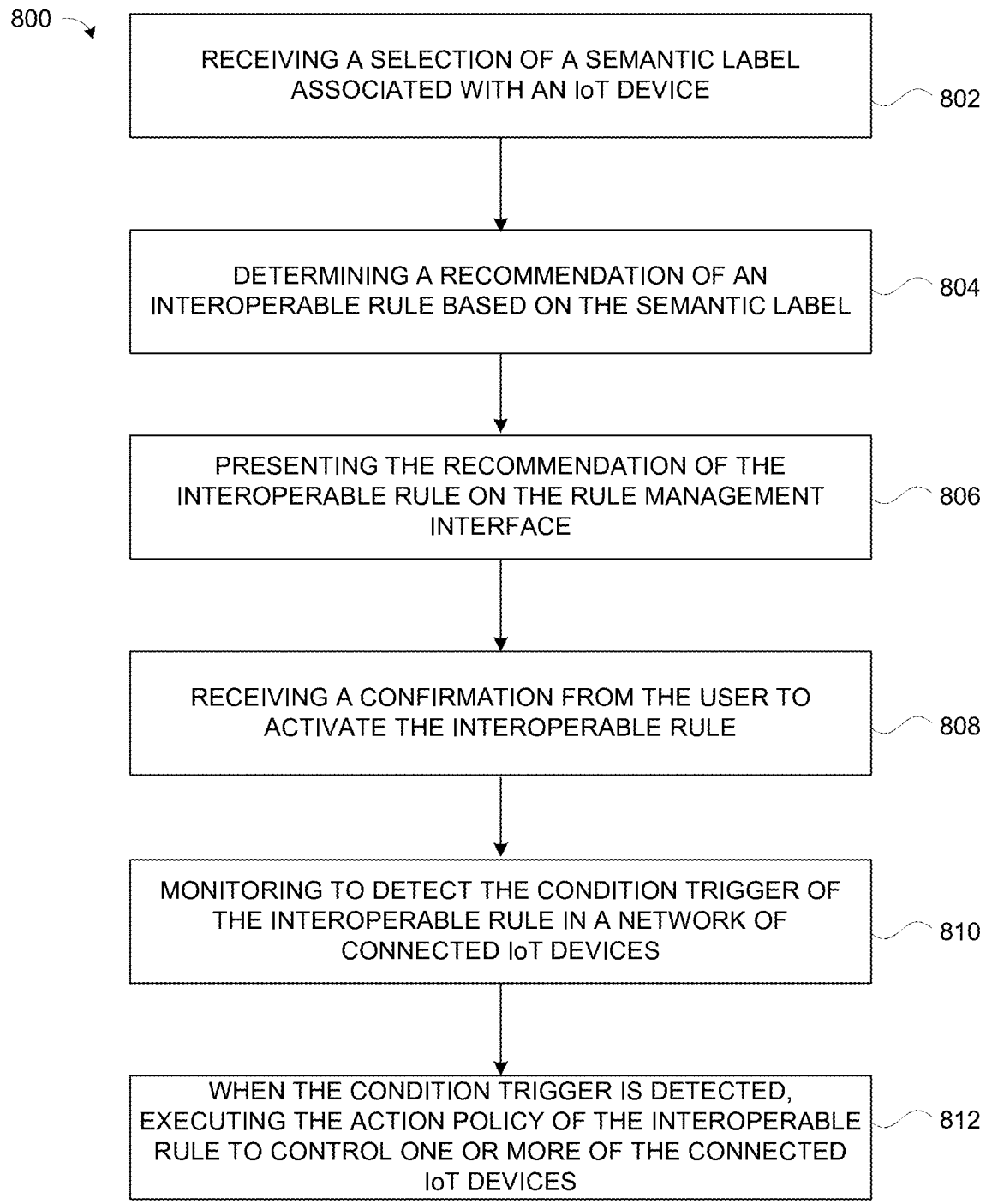
FIG. 8 is a flow diagram of a method of interoperable IoT rule management, consistent with various embodiments of the disclosed technology.

FIG. 8 is a flow diagram of a method 800 of interoperable IoT rule management, consistent with various embodiments of the disclosed technology. The method 800 includes receiving a selection of a semantic label associated with an IoT device from a user at step 802. The step 802 may be implemented by the rule generation module 310 of FIG. 3 through correspondence with a rule management interface. The semantic label may be generated from the data analysis module 308 of FIG. 3. Several semantic labels may be presented on the rule management interface, such as via the integration application 328 of FIG. 3 or the rule management interface illustrated in FIGS. 9A-9C. In various embodiments, the semantic label may be associated with more than one IoT devices.

The rule generation module 310 may determine a recommendation of an interoperable rule based on the semantic label in a step 804. Each interoperable rule may include a contextual condition trigger and an action policy to be executed when the contextual condition trigger is detected. The recommendation of the interoperable rule may be determined based on the selected semantic label, available context, and/or data dimensions from the IoT device associated with the semantic label. The interoperable rule recommendation may be determined based on a history of user behavior in operating IoT devices. The interoperable rule recommendation may be based on a previously configured interoperable rule by the user. The interoperable rule recommendation may be determined based on previously configured interoperable rules by other users of a similar user profile (e.g., age, gender, hobby, profession, or other demographic profile) as the user. The interoperable rule recommendation may be determined based on socially recommended interoperable rules by another user who is associated with the user via a social connection.

In response to receiving the selection, rule generation module 310 may present the recommendation of the interoperable rule on the rule management interface in a step 806. At a step 808, the rule management interface may receive a confirmation from the user to activate the interoperable rule.

In response to activation of the interoperable rule, the event track module 216 may monitor to detect the condition trigger of the interoperable rule in a network of connected IoT devices in a step 810. The condition trigger may include a contextual determination, a data pattern, or a state of the IoT device associated with the selected semantic label. When the condition trigger is detected, the rule execution module 314 may execute the action policy of the interoperable rule to control one or more of the connected IoT devices in a step 812. The one or more of the connected IoT devices to be controlled by the action policy may include the IoT device associated with the selected semantic label.

Figure 9A:
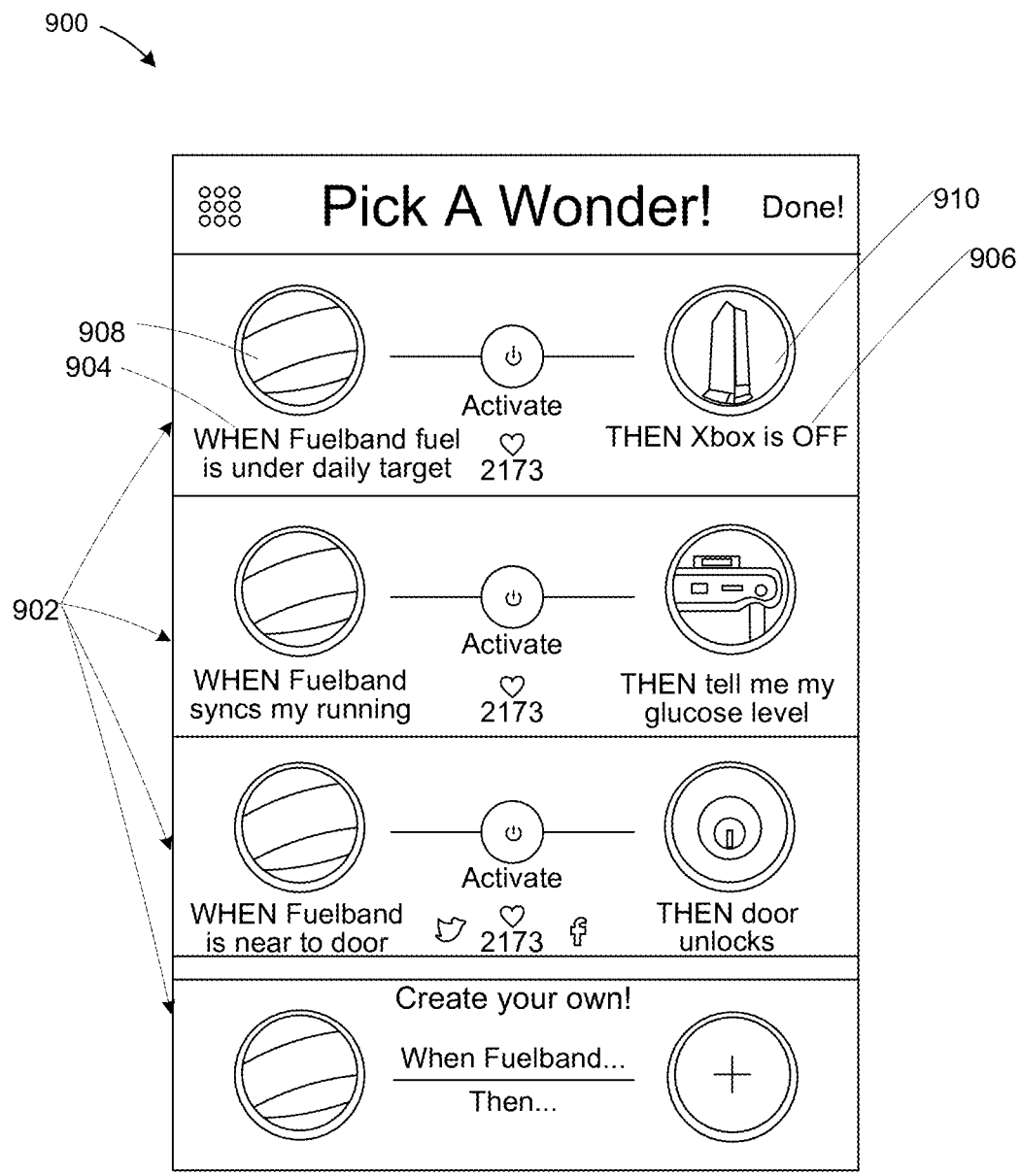
FIG. 9A is an exemplary screen shot illustrating a rule management interface of an integration platform at a rule activation stage, consistent with various embodiments of the disclosed technology.

FIG. 9A is a screen shot of a rule management interface 900 of an integration platform at a rule activation stage, consistent with various embodiments of the disclosed technology. FIG. 9A illustrates a list of interoperable rules 902, each with a condition trigger 904 linked to an action policy 906. Each condition trigger 904 may be described with respect to the semantic label and context of the IoT device involved for the condition trigger 904. A monitor device icon 908 may represent the IoT device involved with the condition trigger 904. Similarly, each action policy 906 may be described with respect to the semantic label and context of the IoT device involved for the action policy 906. An action device icon 910 may represent the IoT device involved with the action policy 906.

Figure 9B:
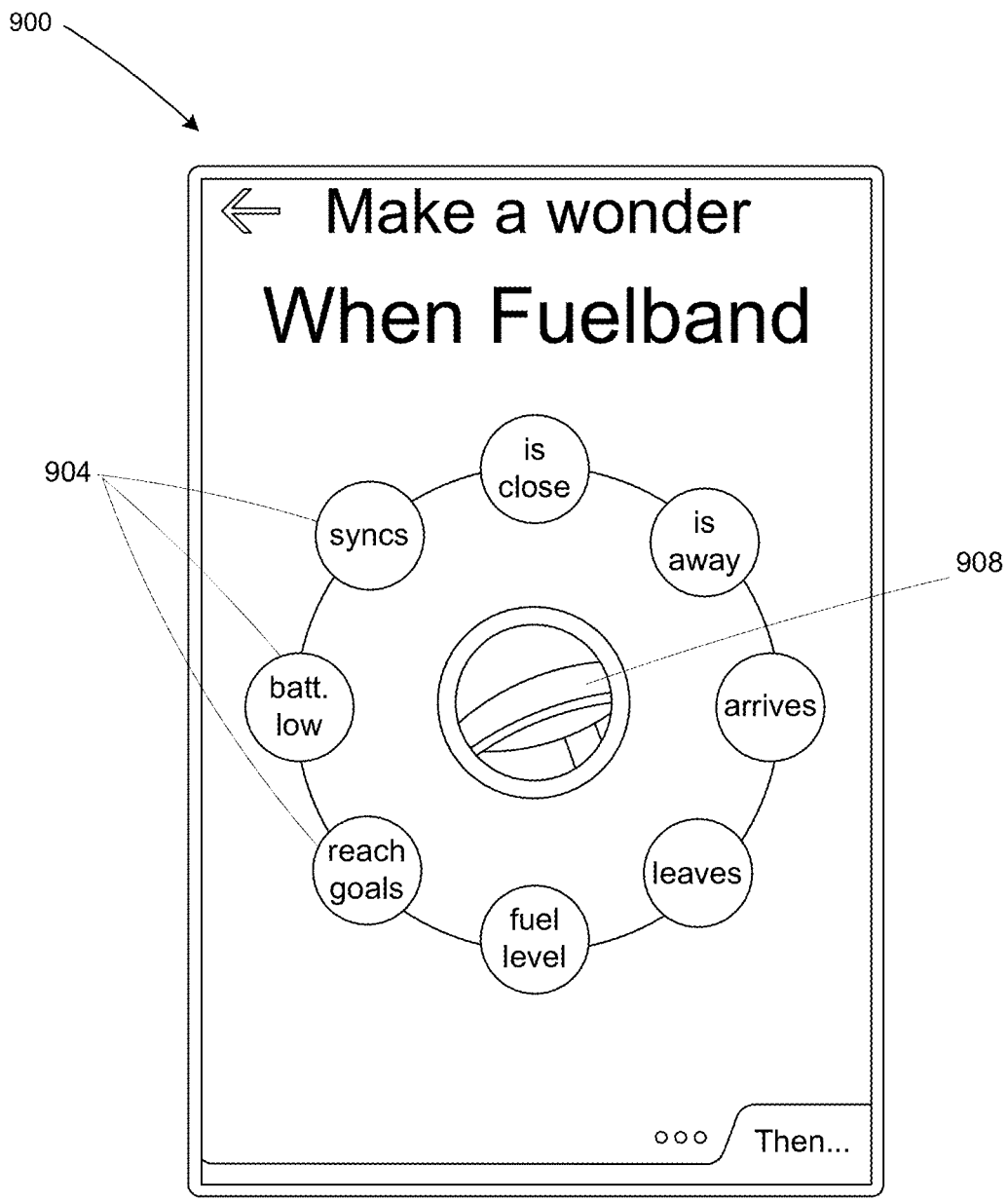
FIG. 9B is an exemplary screen shot illustrating the rule management interface of the integration platform at a condition selection stage, consistent with various embodiments of the disclosed technology.
Figure 9C:
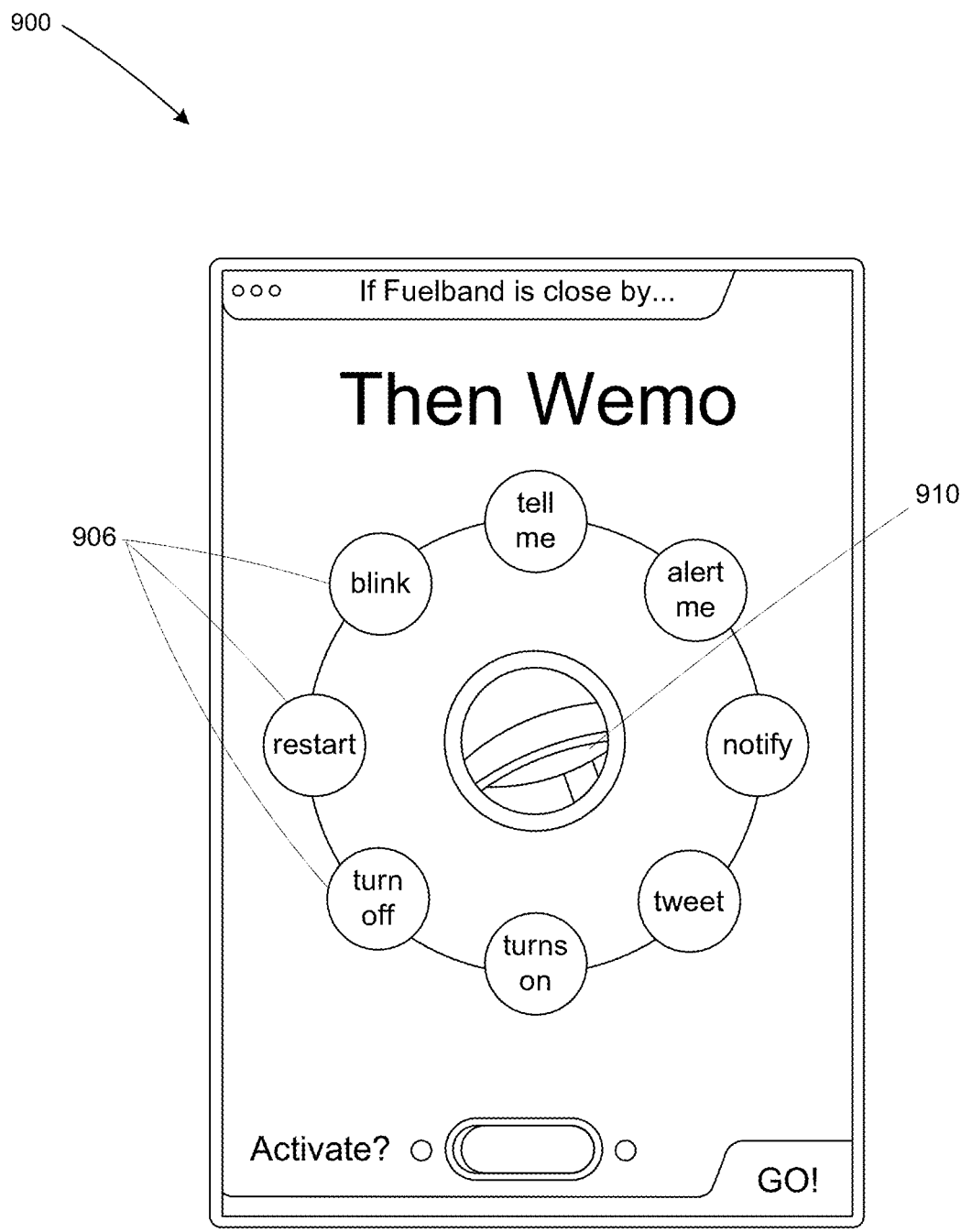
FIG. 9C is an exemplary screen shot illustrating the rule management interface of the integration at an action selection stage, consistent with various embodiments of the disclosed technology.

FIG. 9B is a screen shot of the rule management interface 900 of the integration platform at a condition selection stage, consistent with various embodiments of the disclosed technology. FIG. 9B illustrates a circle of various condition triggers 904 around the monitor device icon 908 for a user to select. FIG. 9C is a screenshot of the rule management interface 900 of the integration platform at an action selection stage, consistent with various embodiments of the disclosed technology. FIG. 9C illustrates a circle of various action policies 906 around the action device icon 910 for the user to complete the interoperable rule 902.

FIG. 10A is an exemplary screen shot 1000 illustrating the consolidation interface showing a correlative insight, consistent with various embodiments of the disclosed technology. FIG. 10A illustrates a correlative insight 1002 determined based on analysis of correlated data regarding a user's activity and glucose level as shown in the correlated data diagram 1004. FIG. 10A further illustrates an interoperable rule 1006 that may be defined and/or configured by the user in response to viewing the correlative insight 1002.

FIG. 10B is an exemplary screen shot 1050 illustrating the consolidation interface generating the interoperable rule 1006 from the correlative insight, consistent with various embodiments of the disclosed technology. The interoperable rule 1006 of FIG. 10A may be further described and/or configured. For example, the screen shot 1050 illustrates a description of a recommended interoperable rule 1006 of alerting the user when there is high activity range reached.

Figure 11A:
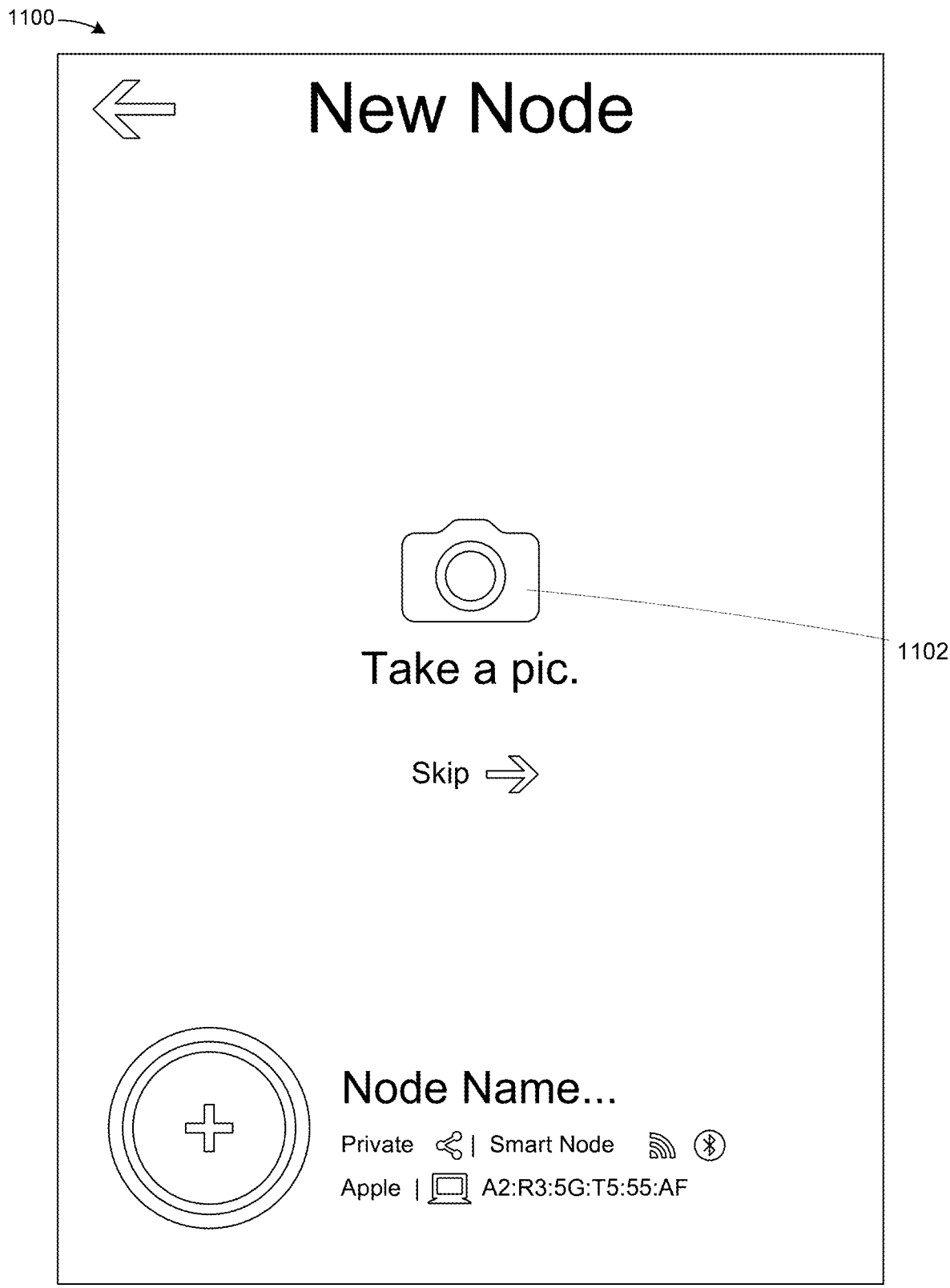
FIG. 11A is an exemplary screen shot illustrating a semantic camera interface at a first stage, the semantic camera interface used in conjunction with a life line diagram, consistent with various embodiments of the disclosed technology.

FIG. 11A is an exemplary screen shot illustrating a semantic camera interface 1100 at a first stage, the semantic camera interface used in conjunction with a life line diagram, consistent with various embodiments of the disclosed technology. At the first stage, the user is requested to add a node to the life line diagram. A semantic camera icon 1102 is shown in the center of the semantic camera interface 1100 to take a picture of node in question for labeling and/or image recognition.

Figure 11B:
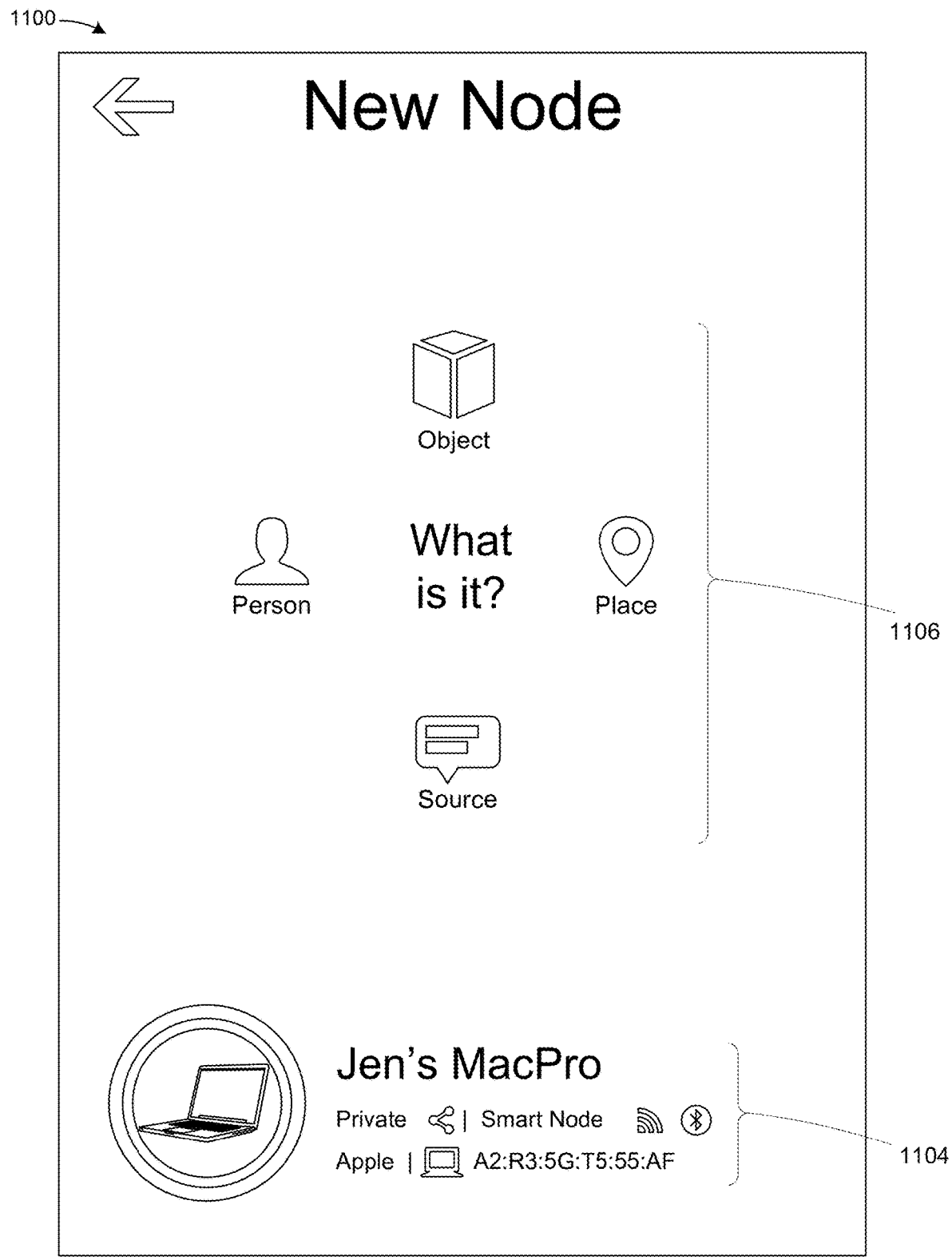
FIG. 11B is an exemplary screen shot illustrating the semantic camera interface at a second stage, the semantic camera interface used in conjunction with a life line diagram, consistent with various embodiments of the disclosed technology.

FIG. 11B is an exemplary screen shot illustrating the semantic camera interface 1100 at a second stage, the semantic camera interface used in conjunction with a life line diagram, consistent with various embodiments of the disclosed technology. At the second stage, the user is asked to semantically label a type of entity of the node added. The bottom of the screen shot shows the recognized entity 1104 associated with the node to be added as determined by the integration platform 300. The center of the screen shot shows an entity type query 1106 that requests the user to label the type of the node added.

Figure 11C:
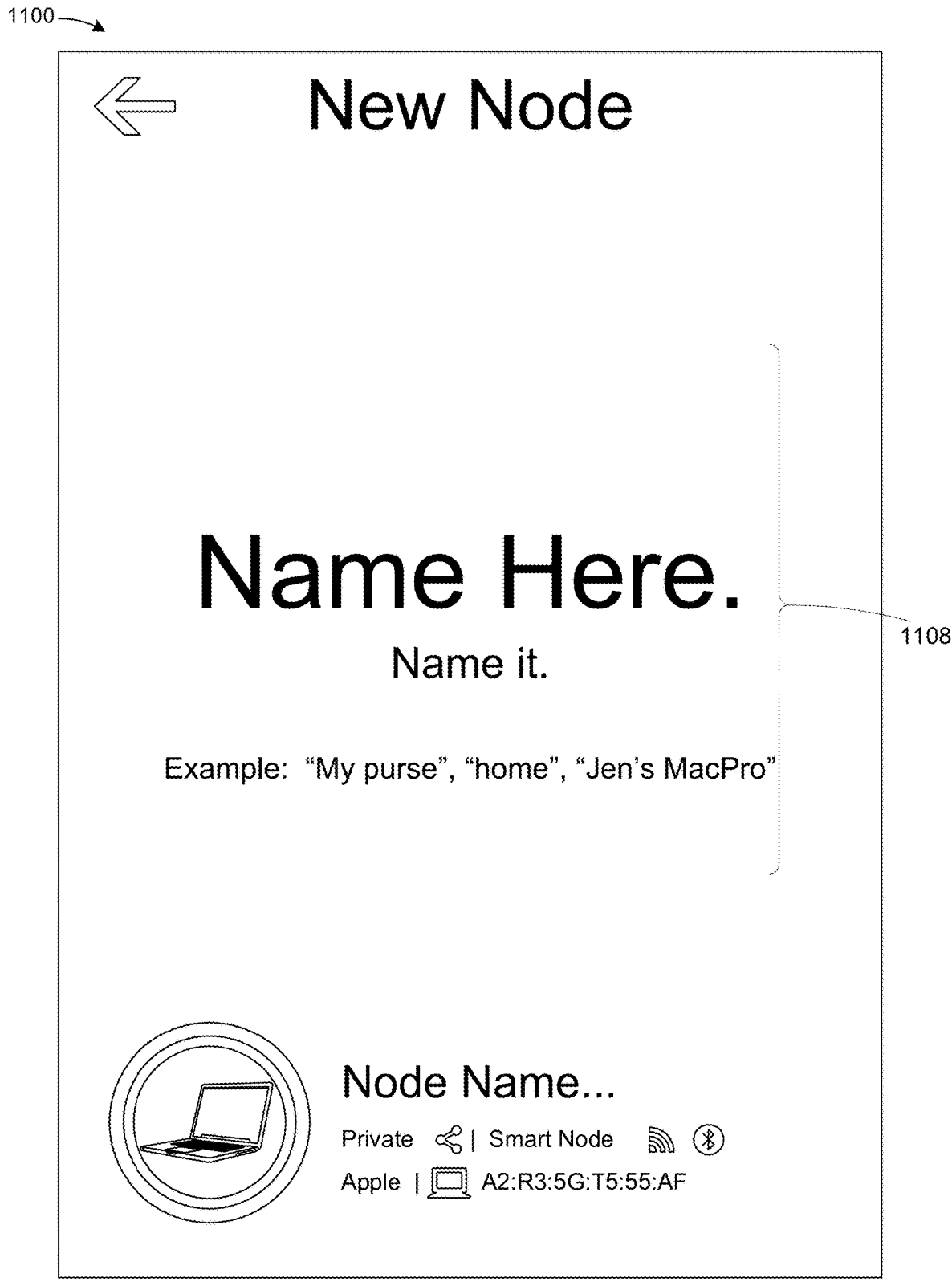
FIG. 11C is an exemplary screen shot illustrating the semantic camera interface at a third stage, the semantic camera interface used in conjunction with a life line diagram, consistent with various embodiments of the disclosed technology.

FIG. 11C is an exemplary screen shot illustrating a semantic camera interface 1100 at a third stage, the semantic camera interface used in conjunction with a life line diagram, consistent with various embodiments of the disclosed technology. At the third stage, the user is asked to semantically label the node added. The center of the screen shot shows a semantic label query 1108 that requests the user to semantically label the node added.

Figure 11D:
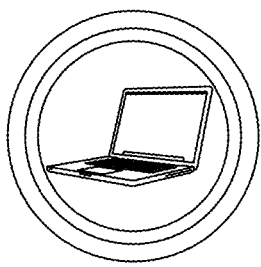
FIG. 11D is an exemplary screen shot illustrating the semantic camera interface at a fourth stage, the semantic camera interface used in conjunction with a life line diagram, consistent with various embodiments of the disclosed technology.

FIG. 11D is an exemplary screen shot illustrating a semantic camera interface 1100 at a fourth stage, the semantic camera interface used in conjunction with a life line diagram, consistent with various embodiments of the disclosed technology. At the fourth stage, the user is asked to associate the node added with one or more people. The center of the screen shot shows a social association query 1110 that requests the user to associate the node added with one or more people.

Situation Forecasting

An IoT integration platform can generate situation forecasts associated with a target entity that is trackable by the IoT integration platform. The target entity can be an individual device, a location, an individual person associated with an IoT integration platform account, a group of individual persons, devices or places, or any combination thereof. The IoT integration platform can generate the situation forecasts continuously or periodically according to a preset schedule. A situation forecast is a prediction of an occurrence of a contextual situation associated with the target entity. A contextual situation can be selected from a set of enumerated possible situations. An enumerated possible situation can be associated with one or more profile attributes of the target entity and/or one or more profile attributes of one or more related entities, which are in turn associated with the target entity. In some embodiments, the set of possible contextual situations is open ended. In some embodiments, the set of possible contextual situations is close ended and predefined within the IoT integration platform. An enumerated possible situation can be associated with one or more entity states. An enumerated possible situation can further be associated with a potential user activity occurring at a particular time frame. Forecasting contextual situations enable the IoT integration platform to predict within a predictable statistical confidence level that a particular context situation is going to happen. Forecasting can be requested for any point in time in the future (e.g., minutes from now, next day, next week, next month). A "point in time" can be a specific timestamp or a timeframe defined by a starting timestamp and a duration or an ending timestamp.

In some embodiments, location specific situation forecasts, person specific situation forecasts, device specific situation forecasts can impact one another. Accordingly in some embodiments, the IoT integration platform can perform multiple iterations of situation forecasts to identify stable forecasts where individual situation forecasts may affect one another.

Utility and Application of Situation Forecasts

The ability of the IoT integration platform to generate the situational forecasts is a technical improvement of conventional IoT solutions. For example, the situation forecasts advantageously enable the IoT integration platform to predict relevant future events that may affect one or more users across one or more devices and locations. Unlike other technical devices (e.g., weather satellite or earthquake predictor) that predicts real world phenomena, the IoT integration platform can generate personal and context specific predictions that can help its users make better decisions and analyze his/her environment better.

In some embodiments, the situation forecasts can be used to generate action recommendations via the IoT integration platform. Upon the user's approval, the IoT integration platform can execute one or more of the recommended actions via the IoT devices and general-purpose computing devices connected to the IoT integration platform. For example, a recommended action can be rearrangement of a calendar on a mobile device. In another example, a recommended action can be sending of an email from a mobile device. In yet another example, a recommended action can be configuring a schedule of an IoT device, such as a networked thermometer or a networked smart lock. In one example, the situation forecasting can predict at a specific timeframe someone would be at a specific location. Based on this situation forecast, the recommended action can be scheduling of a package delivery during the specific timeframe such that someone can receive and sign a deliverable package. In another example, the situation forecasting can predict that a user will have low sugar at gym today, and so the recommended action can be delivery of a message to a diabetes management mobile application to recommend the user to eat something before going to the gym. In another example, the situation forecasting can predict that a user is going to have a super busy day, and so the recommended action can be delivery of a message to a lifestyle management application to cause the lifestyle management application to send one or more automatic messages to inform others that the user may be late to his/her next meeting(s).

Examples of Situation Forecasts

For example, contextual situations for a target entity that represents a person can include: "going to work out at a gym," "going to have low sugar," "going to have low sugar while working out," "waking up in early morning with lack of sleep," "going to be late to a meeting due to schedule overbooking and/or busy day," "possibility of missing a scheduled exercise due to weather," "going to have fun at the party," or any combination thereof. In some cases, a contextual situation may be associated with a particular location. For example, a contextual situation for a target entity can include: "no one will be home," "office will have the day off," "will have party at the house," "sister will be at the pub tonight and may need a ride," or any combination thereof. In other examples, contextual situations for a target entity that represents a device can include: "the Device will be on," "Device will be off," "Thermostat will be at 27° C.," "the Device will be at [specific state]," or any combination thereof.

Other example of forecasting of contextual situations can include: "a person is going to gym and experiencing sugar drop," "the Pub 'Heart Club' is going to have super busy evening," "Maria will probably be at bar 'Bob's Place' after yoga class tonight," "if a person keeps your training schedule, you can probably lose 5 pounds' weight by next week," "there is a 90% chance that no one is at home at that time," "someone is most likely at home right now," "Mary is probably going to be at yoga at 7 pm on Friday, "the Device will be functional this month," "the Device may be not working by next year," "Tuesday afternoon is the best time to set the meeting," or any combination thereof. The confidence level can be a percentage, such as "90%," or a semantic quantifier, such as "probably," "most likely," or "may be," even though the semantic quantifier is mapped to a percentage of the output of a machine learning model that makes the situation forecast. A semantic quantifier can also correspond to comparative confidence level, such as "better than" or "best," when comparing different potential contextual situation forecasts.

Context Indicators and Other Inputs to the Situation Forecasting

The IoT integration platform can receive a plurality of activity data streams from a plurality of IoT devices across one or more of vertical IoT solutions (e.g., either directly or via a computer server system that serves as a backend for the vertical IoT solutions). The IoT integration platform can also be in communication with one or more user interfaces (e.g., one or more mobile applications and/or websites) and/or one or more third-party application services (e.g., one or more social network services, one or more computer media services, one or more file management services, one or more scheduling services, one or more enterprise services, one or more gaming services, or any combination thereof).

The IoT integration platform can base a situation forecast on a plurality of evolving context indicators associated (e.g., directly or indirectly) with the target entity and/or the raw data from the plurality of activity data streams. The evolving context indicators of other entities connected to the target entity in the entity graph can be considered indirectly associated with the target entity. The evolving context indicators can be updated in real-time and/or in response to new data from the activity data streams. The evolving context indicators can be updated periodically according to a preset schedule. Each context indicator evolves over time based on the raw data from the plurality of activity data streams. Each context indicator can be a derivative of data received from the plurality of activity data streams.

For example, a context indicator can be a state indicator according to a state machine. In some embodiments, a state machine of a trackable entity in the IoT integration platform has an open ended number of states. That is, the IoT integration platform can identify new states automatically and in response to new data from the plurality of activity data streams. In some embodiments, a state machine can have a close ended number of states (e.g., predefined by users of the IoT integration platform, predefined by a developer of the IoT integration platform, by running a recognition process to identify potential states on a historical log of raw activity from the plurality of activity data streams, or any combination thereof). The state machine, for example, can be directly associated with the target entity, a parent entity (e.g., a group that the target entity is part of), a sub entity (e.g., another entity that is part of the target entity), a connected entity (e.g., another entity that is connected to the target entity in an entity graph within a threshold number of link(s)), or any combination thereof. The target entity, the parent entity, the sub entity, and the connected entity can be referred to as a related entity to the target entity. In another example, a context indicator can be a node within an entity graph. In yet another example, a context indicator is a profile attribute associated with a trackable entity related to the target entity. In some embodiments, a context indicator is derived based on one or more other context indicators.

The context indicators can include current profile or historical profiles of trackable entities related to the target entity, previously or concurrently forecasted situations of the related trackable entities, current entity state or historical entity states of the related trackable entities, current state or historical states of an entity graph, third-party public data (e.g., weather, public transportation data, national holiday data, etc.), device specific data, partner application service data, or any combination thereof. A trackable entity in the IoT integration platform is related to the target entity if the trackable entity is the target entity, if the trackable entity is a parent entity or a sub entity of the target entity, or if the trackable entity is connected to the target entity in the entity graph within one or more links (e.g., a sibling entity, an indirected connected entity, etc.).

The entity state of a related trackable entity can be determined utilizing an event detection engine. The event detection engine can utilize the evolving context indicators and/or the activity data streams as input to update the entity state. In some embodiments, the event detection engine updates the entity state in real time and in response to receiving new data from the activity data streams. In some embodiments, the event detection engine updates the entity state periodically according to a schedule based on a historical log of the evolving context indicators and/or reported activities from the activity data streams. The event detection engine can be implemented as a machine learning model that classifies its input features (e.g., activity data from the activity data streams and/or other context indicators regularly computed/updated by the IoT integration platform) into one or more types of events. The machine learning model can be trained by labeled data that identifies examples of different event types and the corresponding input features to those event types. The machine learning model can also be trained by clustering evolving context indicators and/or reported activities to identify events.

The entity graph can be a source of data for the situation forecast. Particularly, a subset of the entity graph within a threshold number of links (e.g., within a single direct connection or within multiple links forming indirect connections) to the target entity. Context indicators from one or more related trackable entities can be extracted to forecast a contextual situation relevant to the target entity. For example, if a target entity is a location (e.g., home of one or more user accounts), then related trackable entities may include devices directly associated with the target entity. If all home related devices are off, the situation forecast engine can detect with confidence that no one is at home. In another example, the target entity can be a person. If the person's spouse has early calendar appointment at work, and the couple usually drives to work together, then the situation forecast engine can determine that the person's arrival time at work will change. In another example, the target entity can be a person. The person's home can be a related trackable entity. Other people associated with the person's home can also be related trackable entities (e.g., potentially two links away in the entity graph). If a person has more than usual people at home, then the situation forecast engine may determine that the person will skip his coming daily training session because he has guests.

Figure 12A:
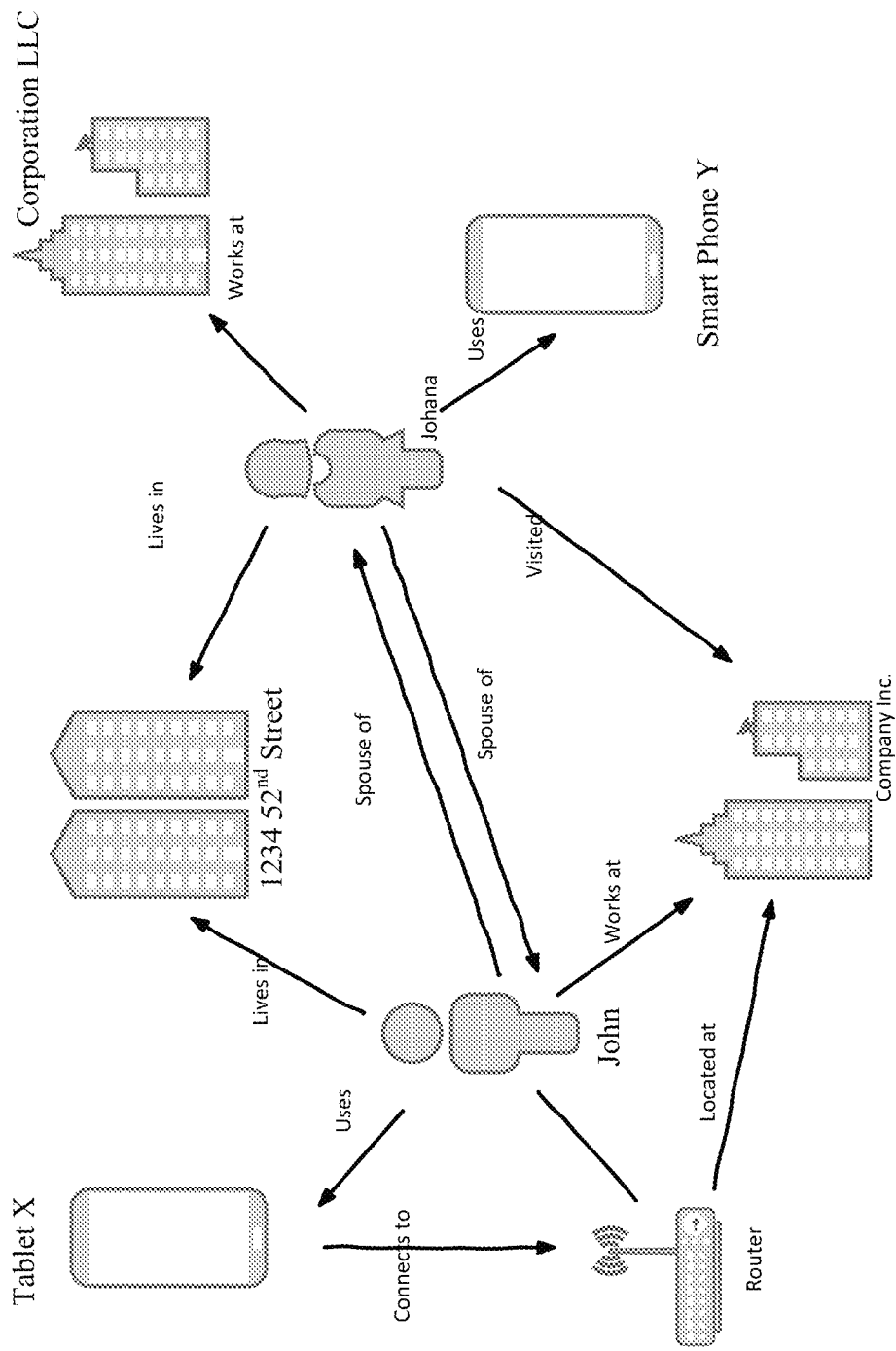
FIG. 12A is a graph diagram illustrating an entity graph maintained by an IoT integration platform, in accordance with various embodiments.
Figure 12B:
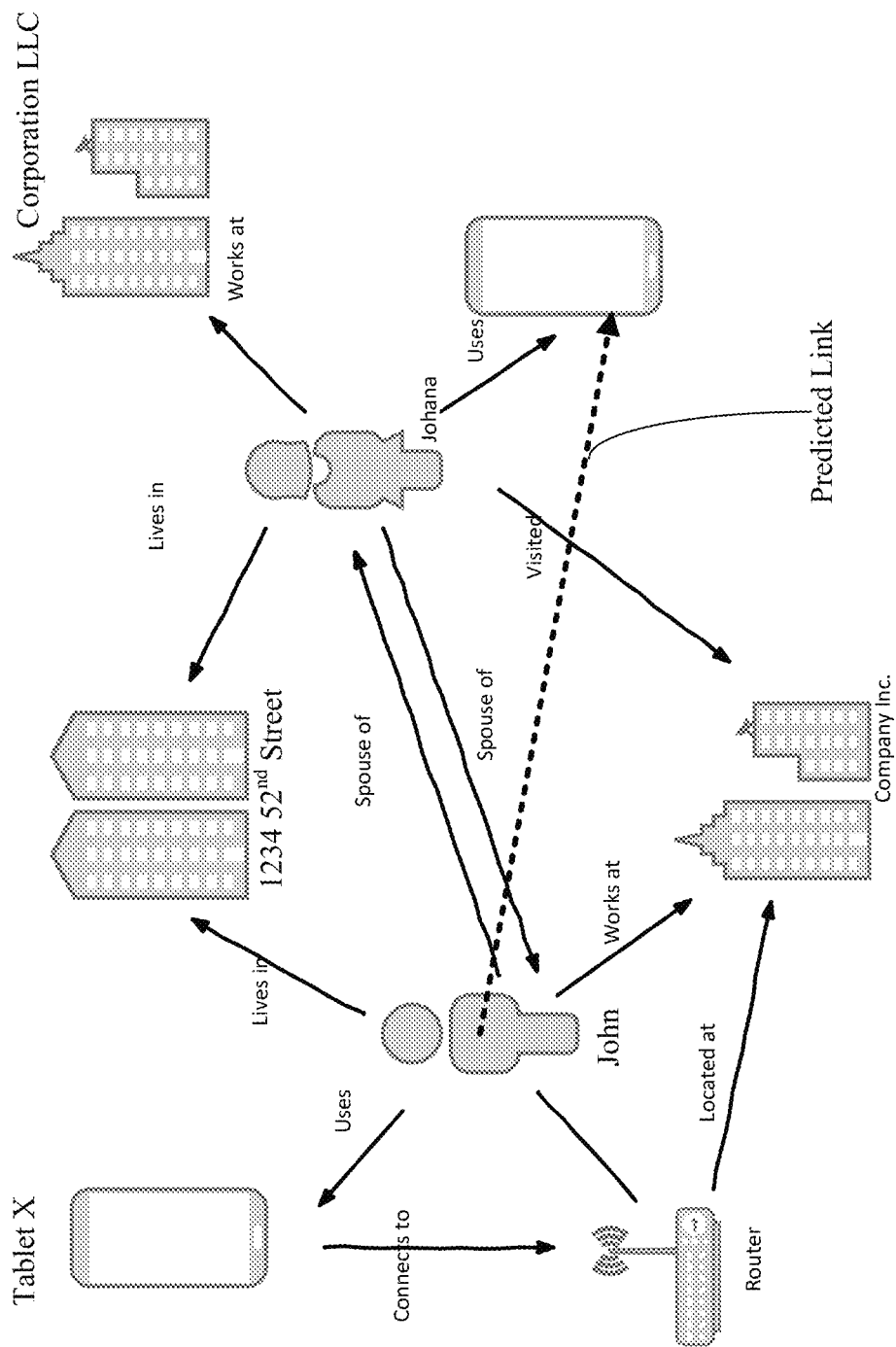
FIG. 12B is a graph diagram illustrating the entity graph of FIG. 12A, where an implicit connection between two entity nodes is inferred by the IoT integration platform.
Figure 12C:
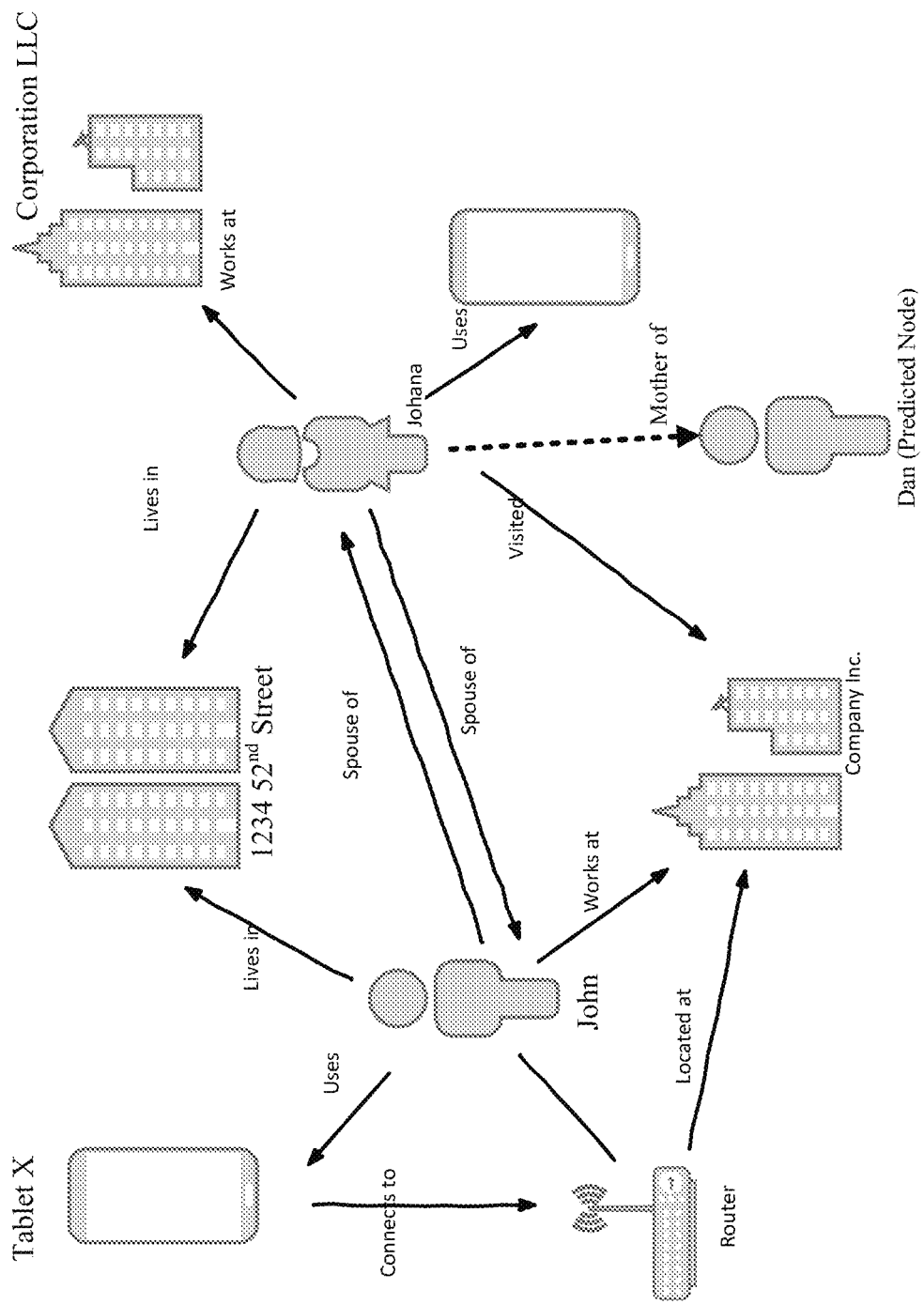
FIG. 12C is a graph diagram illustrating the entity graph of FIG. 12A, where an implicit entity is inferred and added to the entity graph by the IoT integration platform.
Figure 12D:
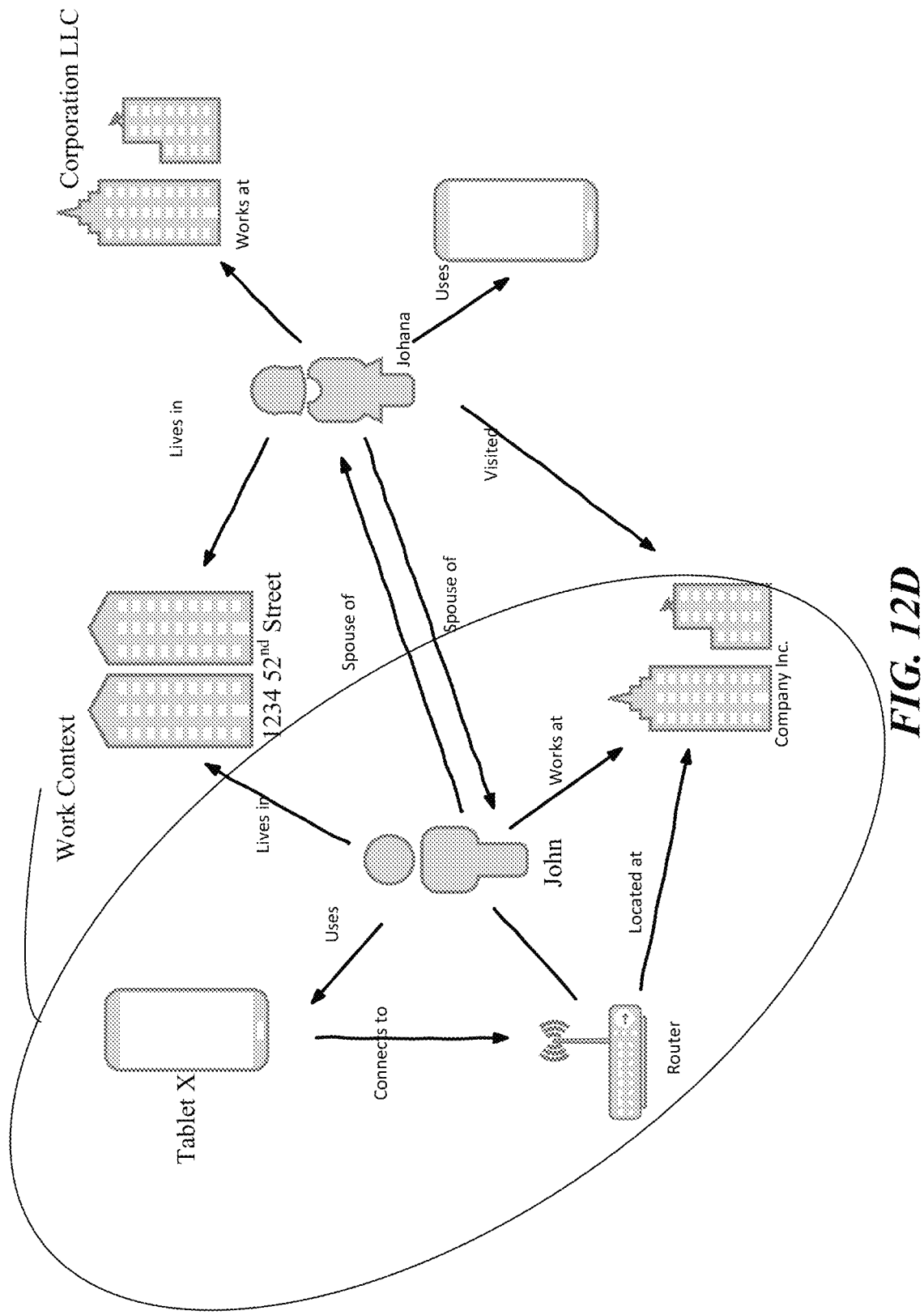
FIG. 12D is a graph diagram illustrating a contextually relevant grouping of nodes in the entity graph of FIG. 12A.

Inference and prediction is done over an entity graph, where users, devices and places are entity nodes, and edges model different types of relationships between entities (see FIG. 12A). FIG. 12A is a graph diagram illustrating an entity graph maintained by an IoT integration platform, in accordance with various embodiments. FIG. 12B is a graph diagram illustrating the entity graph of FIG. 12A, where an implicit connection between two entity nodes is inferred by the IoT integration platform. FIG. 12C is a graph diagram illustrating the entity graph of FIG. 12A, where an implicit entity is inferred and added to the entity graph by the IoT integration platform. FIG. 12D is a graph diagram illustrating a contextually relevant grouping of nodes in the entity graph of FIG. 12A.

Inferring subject's connections over entity graph contribute in multiple ways to results of a situation forecast. For each forecasting situation, the calculated features define the required subset of entities of the entity graph that are significant for solving the machine learning problem here. Therefore, it is also important to mention that some links between entity graph nodes might be invisible however significant. Hence they are detected by additional computations. The links are invisible if raw implicit data about the link has not been collected by the IoT integration platform. However, the context of the entity graph enables the IoT integration platform to compute a new link (e.g., an edge between nodes in the entity graph).

For example, when computing a situation forecast for person (e.g., user A) and the person has never connected to home automation device X, but the IoT integration platform knows that device X is located at the person's home, then the IoT integration platform induces that there is actually invisible link between person A and device X. For example, the IoT integration platform can determine the location(s) of device X from an activity data stream from device X and update the location(s) as a profile attribute of a historical profile of device X. Such links are created based on link analysis and clustering. And these links contribute to situation forecasting and enable detection of additional significant nodes and/or edges that might be the subject of forecasting calculations.

Device specific data come from one or more of the activity data streams. In each data source, a user can give permission to the IoT integration platform to extract information from a general-purpose computing device or an IoT device associated with the user. Such information can improve the user's experience for communicating with other people, places and devices. For example, the device specific data can include activity tracker data, blood pressure data, calendar data, or any combination thereof. For example, a doctor appointment in a person's calendar may impact person behaviors. Blood glucose data can impact person's wellbeing and might cause change in user's behaviors. Different application service partners and IoT solution partners can connect their devices and software application data with the IoT integration platform to further enrich the machine learning models of the IoT integration platform.

Each historical profile can correspond to a single trackable entity. A historical profile can include one or more profile attributes. The profile attribute can be an enumerated value, such as "male" or "female", "on" or "off", or "day" or "night". A profile attribute can also be a numeric value, such as a numeric value representing temperature, heartbeat, time, location coordinate, IP address, physical address, or any combination thereof.

Historical profiles are computed for each entity (e.g., place, device and person). Historical profiles keep the statistical information about the entity and its behaviors in different points of time and timeframes by answering to the questions: how, what, when, where and with whom. Profiles can also be created per interaction of different entity types.

For example, person X was running with person Y at place Z on Sunday. Statistical metadata is collected for each type of profile. For example, how many times it has occurred, variations of times that such interactive activity has happened, how many steps have been done, etc.

Profiles for places and devices can be independent of users. It means that places' and devices' profiles are not created specifically per user, but rather over all the data that the IoT integration platform has collected and all events that the IoT integration platform has detected. An "event" is a label on one or more activity data classified by the event detection engine of the IoT integration platform event. The event detection engine can utilize machine learning to detect specific event types. In one example, an event based on location data can be described that "user A has arrived at location X" or "user B has left location X." Places and devices are independent entity nodes in the entity graph. A historical profile can be specific to a single entity over all the data available to the IoT integration platform by using a crowdsourced approach.

All data is collected anonymously and serves the purpose of situation mapping in statistical aspects. Profiles can be computed periodically as an offline process or as part of online process every time that an event is detected. The IoT integration platform detects these events with certain confidence (e.g., within a statistical confidence level) and saves the relevant historical snapshots of the events to a historical log in the data storage of the IoT integration platform. Historical profiles can be kept in one or more graph structures, one or more non-schematic document structures, one or more files, or any combination thereof.

Situation Forecast Engine Configuration

To set up the ability to forecast contextual situations, the IoT integration platform trains one or more machine learning models based on the evolving context indicators and/or raw activity data. In some embodiments, the machine learning models include one or more supervised machine learning models that require labeled data. In these embodiments, the IoT integration platform provides examples of contextual situations and the evolving context indicators leading up to the given examples as the labeled data. In some embodiments, the machine learning models include one or more unsupervised machine learning models. In these embodiments, the IoT integration platform enables the machine learning models to generate novel potential contextual situations and/or novel categories of potential contextual situations.

The IoT integration platform can define a set of possible contextual situations. In some embodiments, each contextual situation corresponds to one or more states of one or more entities tracked by the IoT integration platform, one or more profile attributes of one or more entities tracked by the IoT integration platform, one or more event types maintained by the event detection engine, or any combination thereof.

In some embodiments, the IoT integration platform can perform multiple iterations of updating context indicators. For example, one context indicator can depend on another context indicator. The IoT integration platform can perform a set number of iterations or iterate until a stable pattern can be observed amongst the evolving context indicators. In some embodiments, the IoT integration platform can perform multiple iterations of forecasting contextual situations. For example, one situation forecast can depend on another situation forecast. The IoT integration platform can perform a set number of iterations or iterate until a stable pattern can be observed amongst the situation forecasts.

Location/place specific situation, person specific situation, and device specific situations can impact one another. For example, detecting that my home has multiple people (e.g., having guests at home) impacts personal behavior. In another example, if usually all devices at home would be turned off at a particular time, a situation forecast of the device may be that the "device will be off." However, if there is a location specific situation forecast that determines "multiple people at home," the device specific situation forecast can be changed to "device will be on." All devices, people, places that interact with each other impact the forecasting situation with each one of them.

Contextualized Ensemble of Machine Learning Models

The IoT integration platform can utilize one or more machine learning models to predict a contextual situation associated with a target entity. Preparation of the machine learning models include data processing (e.g., collecting activity data and computing context indicator updates), feature extraction (e.g., formatting processed data for model deliberation and/or training), model training, model deployment, and post processing of model deliberation results (e.g., classification of numeric results into situation forecasts). The machine learning models can utilize multiple feature types. In some cases, at least some of the feature types are dependent from one another. In some cases, at least some of the feature types are independent from one another. The machine learning models can include a supervised machine learning model, which learns from labelled data indicating known contextual situations and associated context indicators and/or activity data. In some embodiments, the labeled data can be generated automatically. In some embodiments, the labeled data can be generated by requesting user feedback. In some embodiments, after each situation forecast, the IoT integration platform can request and collect a feedback to confirm or deny the forecasted situation from the user (e.g., after the predicted timeframe of the situation forecast has passed).

Modelling and learning of entity behavior can be done using probabilistic machine learning models. For example, the IoT integration platform can train: a global model of the entire user population; a subpopulation model of users that might exhibit common behavioral patterns; e.g., by country, city or profession; a user specific model (e.g., capturing their unique personal behavioral patterns); a location specific model (e.g., characterizing the behaviors of the location/place and ecosystem of the devices that are statically located at that place); location cluster specific model for learning the behavior of a group of locations; a device specific model (e.g., for characterizing the device usage patterns); a device cluster specific model (e.g., for characterizing behaviors of one device type and/or device network); or any combination thereof.

In some embodiments, the machine learning models used for situation forecasts are probabilistic models comprising a prior distribution data structure and a situation likelihood function. Previously observed events can be used to construct a matching prior distribution over all possible events, representing knowledge learned by the system of the characteristic/behavior of a single entity or group of entities. The situation likelihood function can include components representing the dependence of behavior on different features of the entity or the group of entities. The components of the situation likelihood function can be modelled as parameterized distribution functions of various types (e.g., with their parameters being estimated by past observations).

The IoT integration platform can generate situation forecasts using a weighted ensemble of the machine learning models (e.g., the probabilistic models), represented as a weighted combination of the different prior distribution data structures and situation likelihood functions. This enables robust performance even for new entities—for which the entity specific model is not yet well trained—as knowledge on general populations and clusters and relevant sub-populations and clusters are used to estimate the entity specific model, enabling forecasting of entity behavior observed in these populations and clusters. The weighed combination is in itself learned by a personalized meta-model for each entity, resulting in unique characteristics and different levels of pertinence to different sub-populations and clusters represented as a unique mixture over the respective distributions modelling them.

Anomalous Behavior Prediction Using Network Theory Algorithms

The prediction of anomalous or unobserved person behavior (visiting a new location for that person, interacting with a new device, meeting a new person for the first time) is done using various network reconstruction techniques. Link prediction algorithms are used to detect and predict the interaction with known but unconnected nodes (see FIG. 12B), while node prediction and network evolution algorithms can be used to detect and predict interactions with 'hidden' (non-communicating devices, non-user person entities) and new (newly purchased device) nodes (see FIG. 12D).

Furthermore, events and user actions caused by adoption of behavioral pattern in the social network of the user are detected and predicted by simulating processes on the network. The propagation of behavioral patterns is predicted using epidemic-like modelling of trend adoption in social networks.

Situation Forecasting per Multiple Entities

The IoT integration platform enables calculation of situation forecasts of a target entity. In some cases, the target entity is a group entity that represents a set of sub entities. In the case when a set of entities is targeted, the situation forecasting considers the sub-graph of the entities and merges the forecasting situation over multiple entities. The IoT integration platform can detect the sub-graph of set of entities that are targeted for situation forecasts. The IoT integration platform can use edges of the entity sub-graph to discover implicit links (e.g., via link prediction algorithm). The IoT integration platform can compute one or more situation forecasts for each entity by taking into account the features of each entity in the sub-graph. The results of the situation forecasts can be merged via weighted summation (e.g., the weights can correspond to the statistical confidence level provided by the probabilistic models).

Learning from Feedback

The machine learning models can learn (e.g., via additional model training) dynamically from user or platform feedback and update its prior distribution data structure and situation likelihood function to give better forecasting performance. In some embodiments, user feedback indicates whether or not a situation forecast is correct. In some embodiments, user feedback can specify the actual/correct contextual situation to replace an incorrect situation forecasts. This information can be integrated as part of labeled data for training the machine learning models and can therefore adjust the situation likelihood function that classifies input features into contextual situations. In some embodiments, user feedback indicates whether a context indicator (e.g., an entity graph, a profile attribute, an entity state, etc.) is correct, and if not, the correct value of the context indicator. In these embodiments, the corrected context indicator is used to train the machine learning models and/or change the input to the machine learning models when forecasting.

After the IoT integration platform computes a situation forecast, the IoT integration platform can present the situation forecasts to its consumer devices (e.g., an IoT solution specific application, an agent application or a website of the IoT integration platform, a third party user interface, an IoT device, a general-purpose user computing device, or any combination thereof). The IoT integration platform can receive feedback via any data or application protocol interface with the consumer devices. Any application, service, or device that has integrated to the IoT integration platform and consumes a situation forecast may also be a feedback provider. For example, a thermostat application can provide the feedback if recommended/forecasted temperature was accepted by user or changed. If it was changed, the changed value is taken into account and marked as a negative feedback. If no data record indicating change was received, the IoT integration platform can register/mark as a positive feedback on its situation forecast.

The IoT integration platform includes the event detection engine that detects current events. The IoT integration platform can receive the currently detected events as feedback for situation forecasting. For example, if the IoT integration platform forecasts that a person will go to a gym and will have a low sugar, but the event detection engine detects that actually the person is at the restaurant, then the IoT integration platform can register a negative feedback for the situation forecast.

Figure 13:
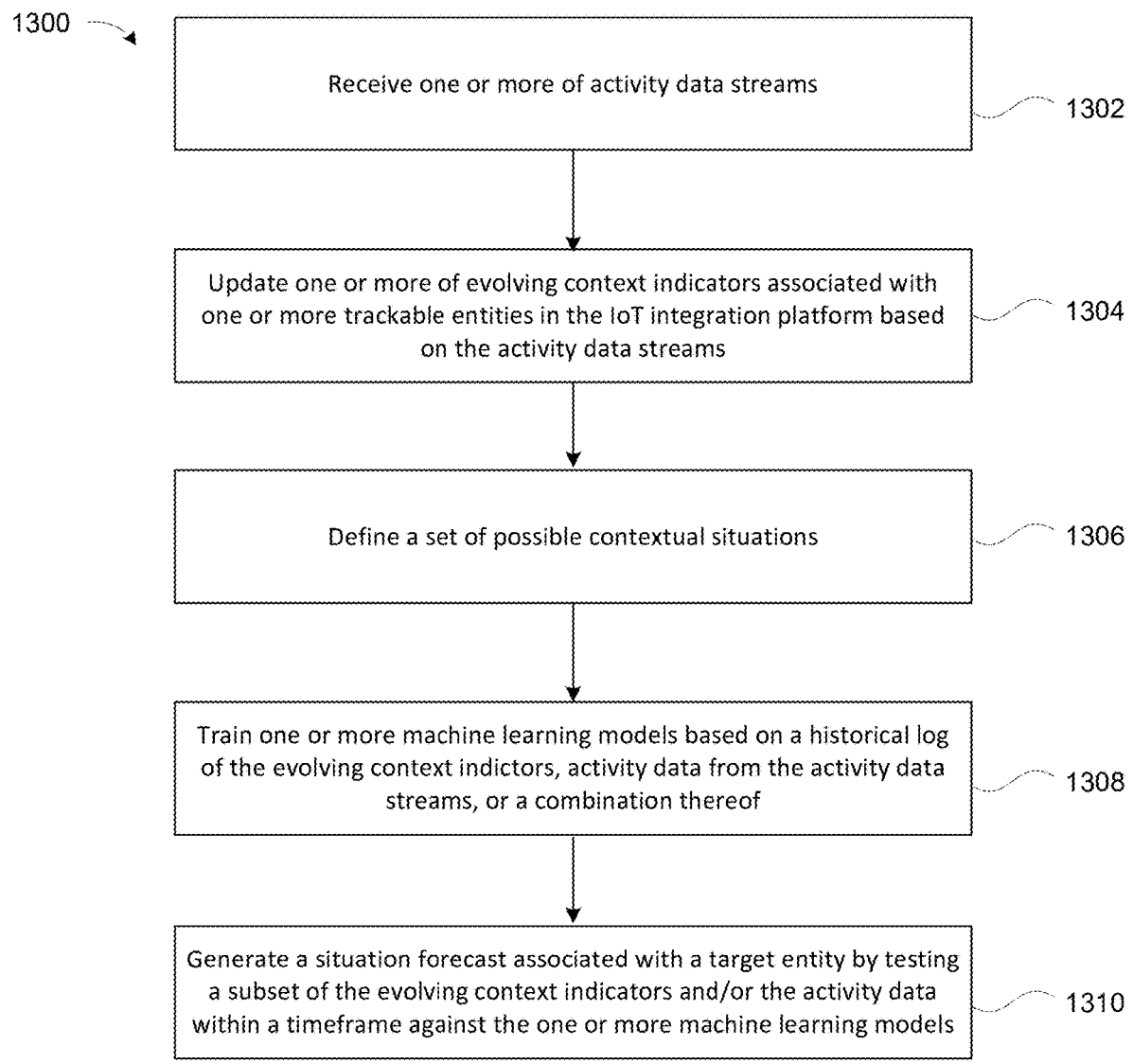
FIG. 13 is a flow chart illustrating a method of generating situation forecast by an IoT integration platform, in accordance with various embodiments.

FIG. 13 is a flow chart illustrating a method 1300 of generating situation forecast by an IoT integration platform, in accordance with various embodiments. At step 1302, the IoT integration platform can receive one or more of activity data streams. The IoT integration platform is implemented in a computer system and connected to multiple data sources from different vertical IoT solutions. The data sources can include one or more IoT devices, general-purpose mobile devices, solution-specific computer server systems, third-party computer server systems, IoT-solution specific Web server systems, or any combination thereof. The activity data streams can include a user reported activity, a third party application observed activity, an IoT integration platform observed or inferred activity, or any combination thereof.

At step 1304, the IoT integration platform can update one or more of evolving context indicators associated with one or more trackable entities in the IoT integration platform based on the activity data streams. The trackable entity can be the target entity, a parent entity that the target entity is part of, a sub entity that is part of the target entity, or a connected entity (e.g., a sibling entity or other indirectly connected entity) that is within a preset threshold number of direct connections to the target entity in the entity graph. The evolving context indicators can include an entity state machine of a trackable entity related to the target entity, an entity graph including a node therein corresponding to the target entity, a profile attribute of the trackable entity, a detected event associated with the trackable entity and observed by the IoT integration platform, or any combination thereof. The entity state machine can be a finite state machine based on predefined states. In one example, updating the entity state machine can include generating a new state (e.g., not predefined) in the entity state machine based on the plurality of activity data streams. In these embodiments, the entity state machine is an infinite state machine with uncountable number of states (e.g., new states can be discovered).

In another example, updating can include analyzing the plurality of activity data streams to detect the event associated with the trackable entity. The detected event can be characterized by a combination of one or more entity states of one or more trackable entities, one or more profile attributes of the trackable entities, one or more occurrences of known activity types, or any combination thereof. The analysis can include classifying activity data in the plurality of activity data streams into one or more events utilizing one or more machine learning models (e.g., models capable of classifying activity data into different event types).

The evolving context indicators can change over time. In some embodiments, the evolving context indicators are updated in response to receiving new data from the plurality of activity data streams. In some embodiments, a context indicator changes as a function of one or more event types associated with subsets of activity data (e.g., from the activity data streams) within a continuous time period. In some embodiments, at least one of the evolving context indicators changes as a function of another one of the evolving context indicators. Accordingly, updating the evolving context indicators can include iterating multiple times to capture interdependent impact of the evolving context indicators on each other (e.g., for a set number of iterations or until a stable pattern of evolving context indicators is reached).

In some embodiments, at step 1306, the IoT integration platform can define a set of possible contextual situations. Each possible contextual situation can be associated with one or more profile attributes, one or more entity states, one or more event types, or any combination thereof. In some embodiments, the set of possible contextual situations is defined specifically for the target entity. In some embodiments, the IoT integration platform can automatically generate the set of possible contextual situations by analyzing a historical log of the activity data streams, the historical log of the evolving context indicators, or a combination thereof.

At step 1308, the IoT integration platform can train one or more machine learning models based on a historical log of the evolving context indictors, activity data from the activity data streams, or a combination thereof. The machine learning models can be supervised or unsupervised machine learning models. The one or more machine learning models can be trained using labeled data that specifies at least a possible contextual situation and one or more corresponding context indicators or activity data known to correlate with the possible contextual situation. The IoT integration platform can also detect a current contextual situation of the target entity and generate labeled data that correlate a historical log of the evolving context indicators to the detected current contextual situation. The IoT integration platform can train the machine learning models based on the labeled data.

At step 1310, the IoT integration platform can generate a situation forecast (e.g., identifying a contextual situation) associated with a target entity by testing a subset of the evolving context indicators and/or the activity data within a timeframe against the one or more machine learning models. For example, the IoT integration platform can compute which of the possible contextual situations best matches the plurality of evolving context indicators.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

What is claimed is:

1. A method comprising:
receiving a plurality of activity data streams at an Internet of things (loT) integration platform, wherein the loT integration platform is implemented in a computer system and connected to multiple data sources from different vertical loT solutions, wherein the data sources include one or more loT devices, general-purpose mobile devices, solution-specific computer server systems, third-party computer server systems, loT-solution specific Web server systems, or any combination thereof, and wherein at least two activity data streams have different data formats;
updating a plurality of evolving context indicators associated with multiple trackable entities in the loT integration platform based on the plurality of activity data streams, wherein the evolving context indicators change over time;
training multiple machine learning models based on a historical log of the plurality of evolving context indictors, activity data from the plurality of activity data streams, or a combination thereof, wherein the multiple machine learning models comprise at least a subpopulation model configured to capture common behavioral patterns and a device-specific model configured to characterize device usage patterns of the multiple data sources based on different data formats of the plurality of activity data streams;
forecasting a contextual situation associated with a target entity based on a weighted combination of situation likelihood functions of the multiple machine learning models; and
generating, by the loT integration system, a recommended action based on the forecasted contextual situation; and
executing, by the loT integration system via at least one of the multiple data sources, the recommended action to affect an activity of the target entity in anticipation of the forecasted contextual situation associated with the target entity.

2. The method of claim 1, further comprising defining a set of possible contextual situations; and wherein forecasting the contextual situation includes computing which of the possible contextual situations best matches the plurality of evolving context indicators.

3. The method of claim 2, wherein the set of possible contextual situations is defined specifically for the target entity.

4. The method of claim 2, wherein each possible contextual situation is associated with one or more profile attributes, one or more entity states, one or more event types, or any combination thereof.

5. The method of claim 2, wherein said defining includes automatically generating the set of possible contextual situations by analyzing a historical log of the activity data streams, the historical log of the evolving context indicators, or a combination thereof.

6. The method of claim 1, wherein updating the plurality of evolving context indicators is in response to receiving new data from the plurality of activity data streams.

7. The method of claim 1, wherein updating the plurality of evolving context indicators includes computing a context indicator as a function of multiple event types of activity data from the plurality of activity data streams.

8. The method of claim 1, wherein at least one of the evolving context indicators is a function of another one of the evolving context indicators; and wherein updating the plurality of evolving context indicators includes iterating said updating multiple times to capture interdependent impact of the evolving context indicators on each other.

9. The method of claim 1, wherein the activity data streams include a user reported activity, a third party application observed activity, an loT integration platform observed or inferred activity, or any combination thereof.

10. The method of claim 1, wherein the evolving context indicators include an entity state machine of a trackable entity related to the target entity, an entity graph including a node therein corresponding to the target entity, a profile attribute of the trackable entity, a detected event associated with the trackable entity and observed by the loT integration platform, or any combination thereof.

11. The method of claim 10, wherein the trackable entity is the target entity, a parent entity that the target entity is part of, a sub entity that is part of the target entity, or a connected entity that is within a preset threshold number of direct connections to the target entity in the entity graph.

12. The method of claim 10, wherein the entity state machine is based on predefined states.

13. The method of claim 10, further comprising generating a new state in the entity state machine based on the plurality of activity data streams.

14. The method of claim 10, further comprising analyzing the plurality of activity data streams to detect the event associated with the trackable entity.

15. The method of claim 14, wherein the detected event is characterized by a combination of one or more entity states of one or more trackable entities, one or more profile attributes of the trackable entities, one or more occurrences of known activity types, or any combination thereof.

16. The method of claim 14, wherein said analyzing includes classifying activity data in the plurality of activity data streams into one or more events utilizing the multiple machine learning models.

17. The method of claim 1, wherein said training includes training the multiple machine learning models using labeled data that specifies at least a possible contextual situation and one or more corresponding context indicators or activity data known to correlate with the possible contextual situation.

18. The method of claim 1, further comprising:
detecting a current contextual situation of the target entity; and
generating labeled data from the historical log of the plurality of evolving context indicators, user feedback of a current contextual situation, the detected current contextual situation, the plurality of activity data streams, or any combination thereof; and
wherein the multiple machine learning models includes at least a supervised machine learning model, the supervised machine learning model being trained via the labeled data.

19. The method of claim 1, wherein machine learning model is specific to a user, a device, a location or place, a group of users, a group of devices, a group of locations or places, or any combination thereof.

20. A computer readable data memory storing computer-executable instructions that, when executed by a computer system, cause the computer system to perform a computer-implemented method, the computer-executable instructions comprising:
   instructions for collecting data from a plurality of Internet of Things (loT) devices, wherein the data comprises at least two data streams of different data formats;
   instructions for semantically labeling the data based on entity-specific context, wherein the entity-specific context corresponds to a user account, a device, a location, or any combination thereof;
   instructions for generating an entity-specific profile based on the semantically labeled data, the entity profile included in an entity graph with connections to associated entities;
   instructions for forecasting a contextual situation associated with a target entity based on a subset of the entity graph within a threshold number of links to the entity-specific profile using multiple machine learning models, wherein the multiple machine learning models comprise at least a subpopulation model configured to capture common behavioral patterns and a device-specific model configured to characterize device usage patterns of the multiple data sources based on different data formats of the plurality of activity data streams, and wherein the contextual situation is forecasted based on a weighted combination of situation likelihood functions of the multiple machine learning models; and
   instructions for generating a recommended action based on the forecasted contextual situation; and
   instructions for executing, via at least one of the plurality of loT devices, the recommended action to affect an activity of the target entity in anticipation of the contextual situation associated with the target entity.

21. The computer readable data memory of claim 20, wherein the possible situation is a wellness related situation.

22. The computer readable data memory of claim 20, wherein the computer executable instructions further comprise instructions for generating a group-entity profile based on the labeled data associated with multiple entities, including the target entity, that form a group; and wherein the instructions for predicting the possible situation associated with the entity includes:
   instructions for predicting a situation forecast associated with the group; and
   instructions for tuning, based on the entity-specific profile, the situation forecast to generate the possible situation associated with the target entity.

23. A computer system comprising:
   a processor system comprising one or more processors;
   a memory system configured to store executable instructions;
   wherein the processor system, when configured by the executable instructions, is operable to:
      receive a plurality of activity data streams at an Internet of things (IoT) integration platform, wherein the loT integration platform is implemented in a computer system and connected to multiple data sources from different vertical loT solutions, wherein the data sources include one or more loT devices, general-purpose mobile devices, solution-specific computer server systems, third-party computer server systems, loT-solution specific Web server systems, or any combination thereof, and wherein at least two activity data streams have different data formats;
      iteratively update a plurality of evolving context indicators associated with one or more trackable entities in an entity graph based on the plurality of activity data streams until a stable pattern of the plurality of evolving context indicators is reached
      traverse the entity graph to identify a set of trackable entities having a threshold number of links to the target entity in the entity graph;
      forecast a contextual situation associated with the target entity based on a subset of the plurality of evolving context indicators associated with the set of trackable entities having the threshold number of links to the target entity using multiple machine learning models, wherein the multiple machine learning models comprise at least a subpopulation model configured to capture common behavioral patterns and a device-specific model configured to characterize device usage patterns of the multiple data sources based on different data formats of the plurality of activity data streams, and wherein the contextual situation is forecasted based on a weighted combination of situation likelihood functions of the multiple machine learning models; and
      generate, by the loT integration system, a recommended action based on the forecasted contextual situation; and
      execute, by the loT integration system via at least one of the multiple data sources, the recommended action to affect an activity of the target entity in anticipation of the forecasted contextual situation associated with the target entity.

24. The method of claim 1, wherein the machine learning model are trained by clustering the evolving context indicators.

25. The method of claim 1, wherein the evolving context indicators associated with the trackable entities in the entity graph include evolving context indicators of other entities connected to the target entity in the entity graph.

26. The system of claim 23, wherein the processor system is operable to iteratively update the plurality of evolving context indicators based on computing a context indicator as a function of multiple event types of activity data from the plurality of activity data streams.

* * * * *